US007703389B2

(12) United States Patent
McLemore et al.

(10) Patent No.: US 7,703,389 B2
(45) Date of Patent: Apr. 27, 2010

(54) COOKING APPARATUS WITH COOKING CHARACTERISTIC MONITORING SYSTEM

(76) Inventors: John D. McLemore, 66 Hickory Ct., Fortson, GA (US) 31808; Don McLemore, 315 Troop Ct., Forston, GA (US) 31808

( * ) Notice: Subject to any disclaimer, the term of this patent is extended or adjusted under 35 U.S.C. 154(b) by 845 days.

(21) Appl. No.: 11/415,415

(22) Filed: May 2, 2006

(65) Prior Publication Data

US 2006/0254432 A1 Nov. 16, 2006

Related U.S. Application Data

(63) Continuation-in-part of application No. 11/020,027, filed on Dec. 23, 2004, now Pat. No. 7,426,885, and a continuation-in-part of application No. 10/917,418, filed on Aug. 13, 2004, now Pat. No. 7,412,922, which is a continuation-in-part of application No. 10/640,691, filed on Aug. 14, 2003, now Pat. No. 6,941,857.

(51) Int. Cl.
*A47J 37/12* (2006.01)
*G01K 1/08* (2006.01)

(52) U.S. Cl. .............................. 99/413; 99/342; 99/343; 99/344; 99/410; 99/412; 99/414; 99/415; 99/448; 99/339; 99/340; 374/155; 374/141; 374/149; 374/150; 374/179; 340/870.17; 340/870.04; 340/870.09; 340/870.01; 340/501; 340/588; 340/584; 340/585

(58) Field of Classification Search ............. 99/342–44, 99/410–415, 448, 339–40, 407; 374/155, 374/141, 149–50, 179, 208; 340/870.17, 340/870.04, 870.09, 870.01, 501, 588, 584–5
See application file for complete search history.

(56) References Cited

U.S. PATENT DOCUMENTS

| 652,531 | A | 6/1900 | Carlson ..................... 99/482 |
| 1,444,647 | A | 2/1923 | Trout et al. ................. 126/59.5 |
| 3,776,127 | A | 12/1973 | Muse |
| 4,020,322 | A | 4/1977 | Muse |
| 4,309,938 | A | 1/1982 | Harmon |

(Continued)

FOREIGN PATENT DOCUMENTS

DE 3437398 4/1986

(Continued)

OTHER PUBLICATIONS

"Smokers & Accessories GALORE!", pulled from internet at http://www.ocbarbecues.comsmokers.asp on Jun. 25, 2004 (3 pages).

(Continued)

*Primary Examiner*—Shawntina Fuqua
(74) *Attorney, Agent, or Firm*—Smith, Gambrell & Russell, LLP

(57) ABSTRACT

A cooking apparatus with an information exchange system that involves an assembly featuring a cooking apparatus such as a smoker or an electric turkey fryer and an information exchange system that provides for local and/or remote monitoring of cooking characteristic that preferably includes food item temperature probing that is displayed externally on the cooking appliance as in a local remote cooking characteristic information conveyance device that are preferably either in unidirectional of bi-directional.

17 Claims, 17 Drawing Sheets

U.S. PATENT DOCUMENTS

| | | | |
|---|---|---|---|
| 4,321,857 A | 3/1982 | Best | |
| 4,325,294 A | 4/1982 | Hammond | |
| 4,377,733 A | 3/1983 | Yamaguchi et al. | 219/10.55 B |
| 4,471,748 A | 9/1984 | Venable | |
| 4,475,024 A | 10/1984 | Tateda | 219/10.55 B |
| 4,509,868 A | 4/1985 | Ronconi et al. | 374/141 |
| 4,626,662 A | 12/1986 | Woolf | 219/501 |
| 4,697,506 A | 10/1987 | Ducate, Jr. | |
| 4,716,411 A | 12/1987 | Nakamura | 340/870.17 |
| 4,770,157 A | 9/1988 | Shepherd et al. | |
| 5,070,776 A | 12/1991 | Schlosser et al. | |
| 5,138,939 A | 8/1992 | Bradley et al. | |
| 5,167,183 A | 12/1992 | Schlosser et al. | |
| 5,713,267 A | 2/1998 | Wilson | |
| 5,718,165 A | 2/1998 | Winstead | 99/400 |
| 5,891,498 A | 4/1999 | Boehler | |
| 5,947,007 A | 9/1999 | O'Grady et al. | |
| 6,035,770 A | 3/2000 | Whitefiled | 99/482 |
| 6,080,972 A * | 6/2000 | May | 219/494 |
| 6,095,132 A | 8/2000 | Ganard et al. | |
| 6,102,028 A | 8/2000 | Schlosser et al. | |
| 6,209,533 B1 | 4/2001 | Ganard | |
| 6,481,344 B1 | 11/2002 | Green et al. | |
| 6,501,384 B2 | 12/2002 | Chapman et al. | 340/584 |
| 6,539,842 B1 | 4/2003 | Chapman et al. | 99/342 |
| 6,568,848 B1 | 5/2003 | Chapman et al. | 374/155 |
| 6,595,197 B1 | 7/2003 | Ganard | |
| 6,701,829 B2 | 3/2004 | Farrow | |
| 6,711,992 B1 | 3/2004 | McLemore | 99/413 |
| 6,712,505 B2 | 3/2004 | Chapman et al. | 374/155 |
| 6,730,890 B2 | 5/2004 | Kish et al. | 219/506 |
| 6,811,308 B2 * | 11/2004 | Chapman et al. | 374/155 |
| 6,941,857 B2 | 9/2005 | McLemore | 99/413 |
| 6,967,900 B2 | 11/2005 | Chapman et al. | 368/10 |
| 7,157,668 B2 | 1/2007 | Bartelick | 219/593 |
| 7,426,885 B2 | 9/2008 | McLemore et al. | |
| 2005/0034611 A1 | 2/2005 | McLemore | 99/413 |
| 2005/0157775 A1 | 7/2005 | Chapman et al. | 374/170 |
| 2009/0078127 A1 | 3/2009 | McLemore et al. | |

FOREIGN PATENT DOCUMENTS

| | | |
|---|---|---|
| JP | 62-062130 | 3/1987 |
| WO | WO 2005/016091 | 2/2005 |

OTHER PUBLICATIONS

"Barbecue Grill Store", pulled from internet at http://www.americabestbbq.com/smokers_grillstore.htm on Jun. 25, 2004 (1 page).

"How Grills Work", pulled from internet at http://home.howstuffworks.com/grill.htn/printable on Aug. 12, 2004 (9 pages).

"Cabela's Christmas 2004", World's Foremost Outfitter, (6 pages), date unknown.

* cited by examiner

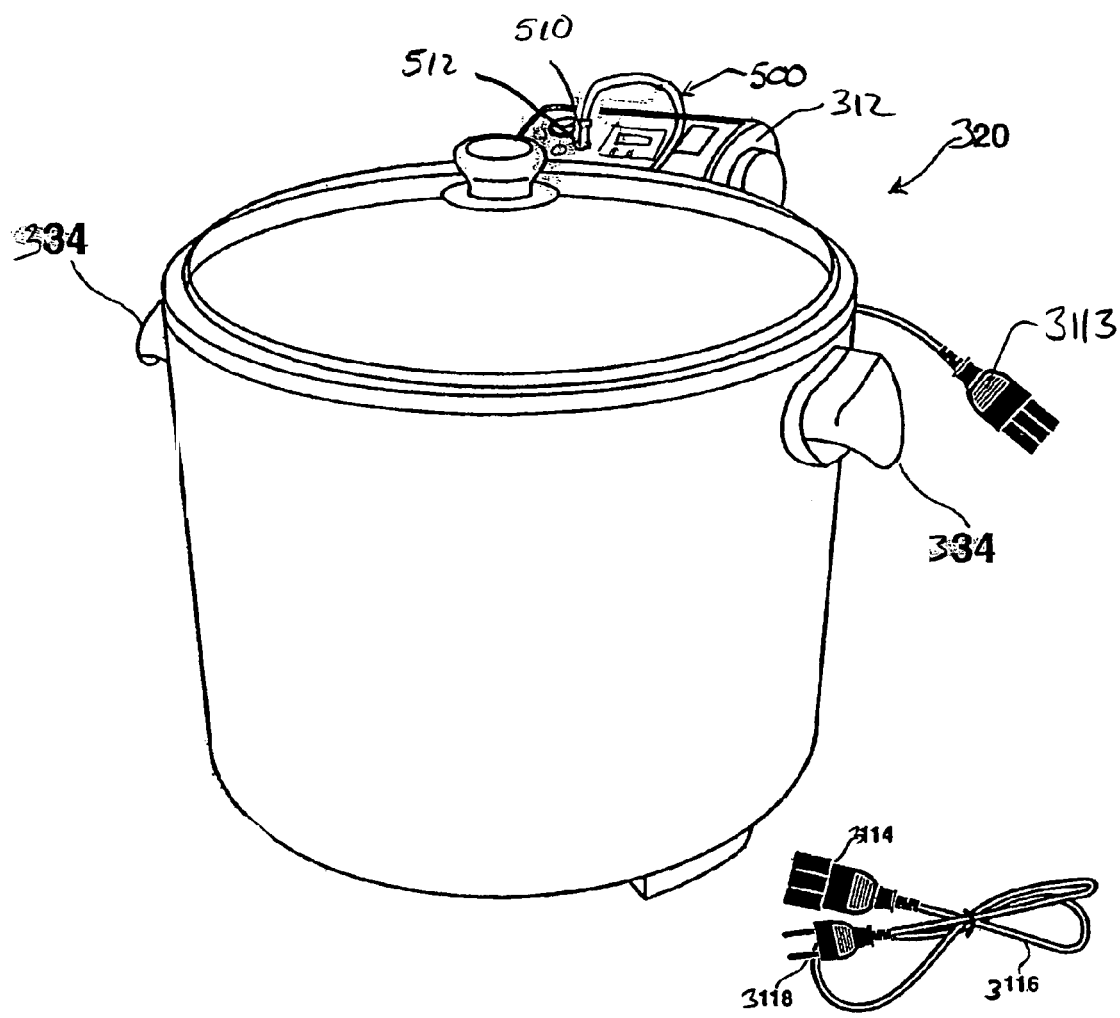
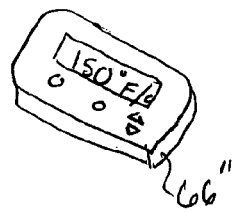
FIG. 9

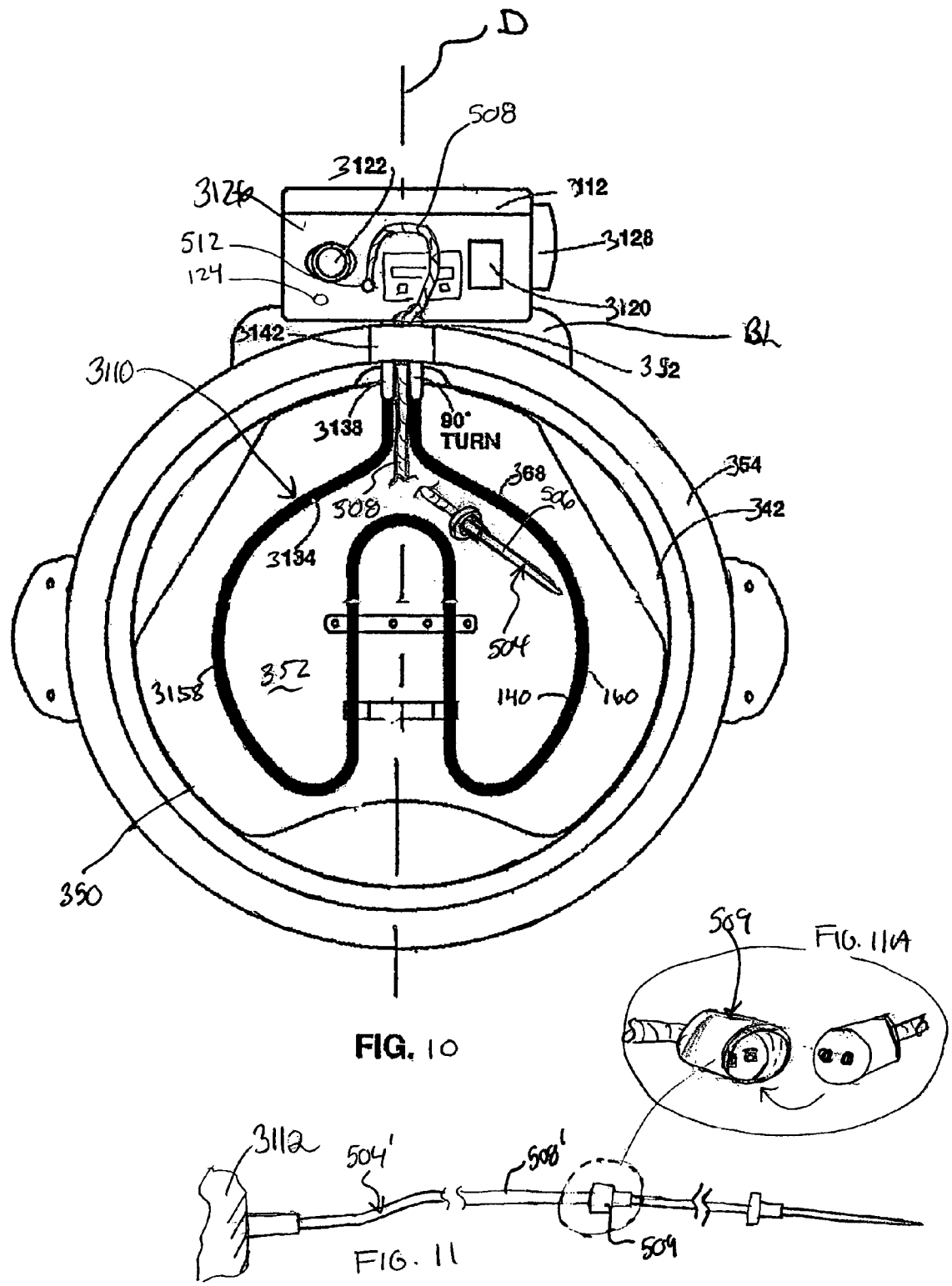

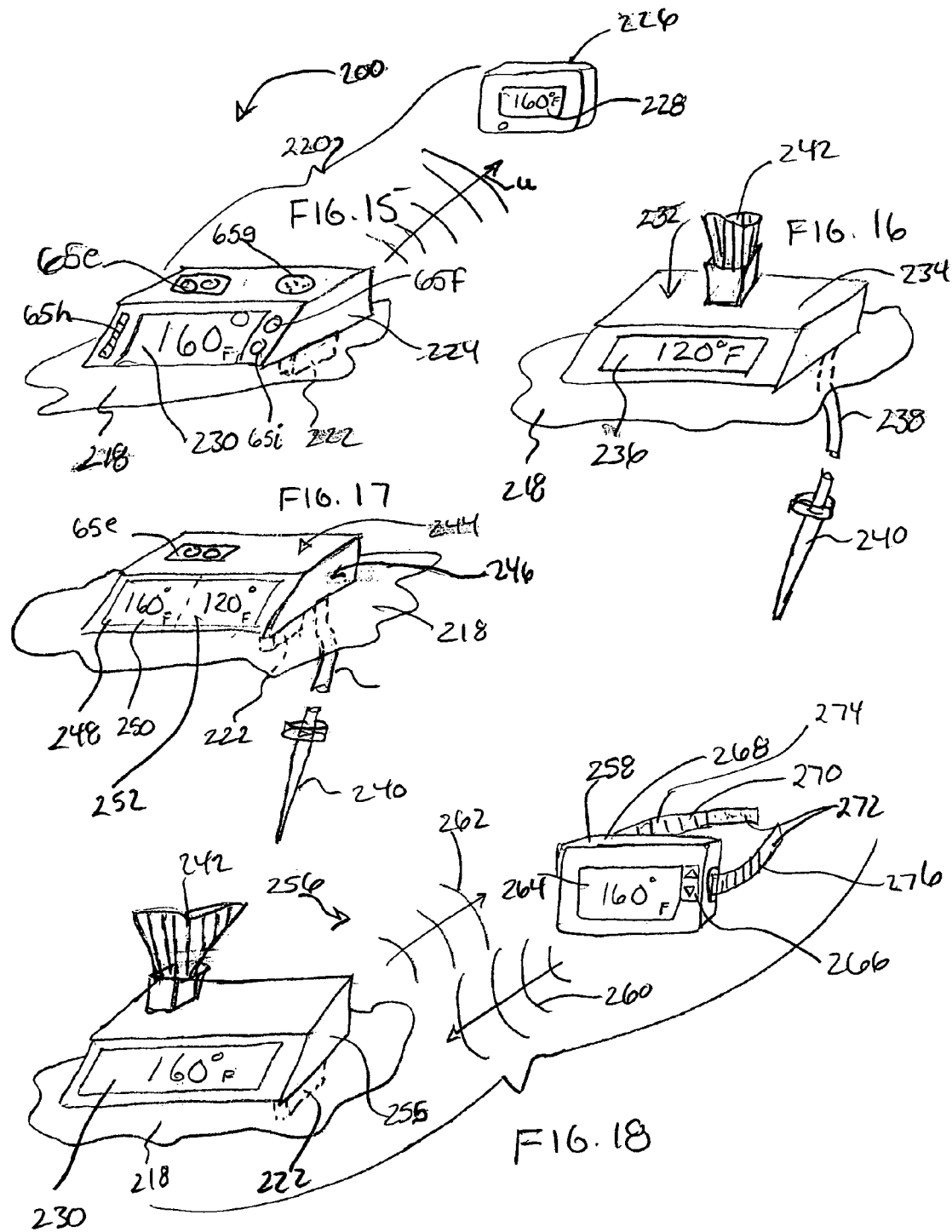

US 7,703,389 B2

COOKING APPARATUS WITH COOKING CHARACTERISTIC MONITORING SYSTEM

CROSS REFERENCE TO RELATED APPLICATIONS

The present invention is a Continuation-In-Part of U.S. Ser. No. 11/020,027 filed Dec. 23, 2004, now U.S. Pat. No. 7,426,885, and is a Continuation-In-Part of U.S. Ser. No. 10/917,418 filed Aug. 13, 2004, now U.S. Pat. No. 7,412,922 which is a Continuation-In-Part of U.S. Ser. No. 10/640,691, filed Aug. 14, 2003, now U.S. Pat. No. 6,941,857, each of which is incorporated herein by reference.

FIELD OF THE INVENTION

The present invention pertains to a cooking apparatus with a cooking characteristic information exchange system useful for cooking characteristic information exchange (e.g., monitoring a food cooking characteristic(s) at the site of the cooker and/or in remote fashion), and a method of using the same. In a preferred embodiment, the cooking apparatus and method feature a probe assembly designed for usage in a cooking device such as a smoker or fryer as in an electric turkey fryer.

BACKGROUND OF THE INVENTION

Both indoor and outdoor cooking has increased in popularity and has led to a variety of cooking devices such as smokers and stand-alone or non-stove top fryers (cooking fluid cooking devices as in frying with oil or steaming with water), with an example being fryers such as the electric turkey fryers of Masterbuilt Manufacturing of Columbus, Ga.

Various conventional cookers of the smoker type also exist and the heat sources for such cookers are typically based on various fuels (or combinations thereof), as in gas, electric (e.g., electric resistance bars or infrared ceramic plates), charcoal, etc. Smokers have also gained in popularity as a smoker provides for imparting a desirable smoked flavor to the food and the cooking technique is generally carried out at low to moderate heat levels. The smoking cooking techniques can also promote basting of the food as the juices from the food are caught and vaporized to baste the food to keep the food moist and prevent dehydration while the smoke flavor is imparted to the food. In addition, with the inclusion of a drip pan the juices can be captured and this drip pan can also hold fluids such as water which, in conjunction with the heat source, provide additional moisture in the food being smoked (e.g., meats, fish, etc.).

A typical conventional smoker assembly includes a housing containing one or more grill racks, the above noted pan positioned below the grill for drippings collection and vapor generation, a heat source, and a wood chip tray or rack, placed adjacent the heat source, to hold the smoke producing material (e.g., to generate the smoke there is typically used materials such as hickory, alder and mesquite wood in any one of a variety of forms as in chips, briquettes, and saw dust).

In addition, the prior art devices include stand alone smokers as seen, for example, in U.S. Pat. Nos. 5,713,267; 4,417,748; 4,309,938; 4,020,322 and 3,776,127 as well as those that are designed as an added feature to a grill assembly as seen by U.S. Pat. Nos. 5,891,498; 5,718,165; 5,167,183 and 4,770,157. Additionally, the prior art discloses a variety of structures for generating the smoke and providing the smoke to the food, including a generally common housing embodiment with both an internalized firebox (where the material is subjected to heat and initiates smoke generation) and a smoke/food contact chamber or smoker location (where the smoke is applied to the food) as seen from U.S. Pat. No. 4,321,857; those with an exterior fire box with direct attachment to a smoker housing as exemplified by U.S. Pat. No. 6,209,533; as well as those that are externally connected to the smoking location via a smoke conduit or the like as seen from U.S. Pat. No. 5,138,939.

The above noted references additionally illustrate ways of supplying the smoke generating material, with U.S. Pat. No. 5,138,939 featuring a supply stack of pellets which are fed via a motorized pusher assembly to the smoke generation location, U.S. Pat. No. 3,776,127 illustrating an upper domed cover which provides access to the interior of the smoker when cool, U.S. Pat. Nos. 5,891,498 and 4,309,938 showing a door access arrangement and U.S. Pat. Nos. 4,770,157 and 5,718,165 illustrating sliding insertion drawers.

A problem associated with the prior art cooking devices and particularly smokers is the inability to accurately monitor the true status of cooking despite the ability to estimate based on prior experience with a cooking apparatus. This often entails periodic checking of a product as in opening a smoker door and testing the food product for temperature level. Particularly when dealing with smokers, this temperature monitoring activity can lead to an alteration in the cooking schedule or a loss in heat build up. This same problem is also associated with fryer devices as in electric turkey fryers such as that disclosed in U.S. Pat. No. 6,941,857 to John McLemore and incorporated herein by reference. In the case of an electric turkey fryer, for example, the bubbling cooking fluid about the submerged turkey makes it very difficult to monitor the degree of cooking the turkey has undergone. Also, the testing requirement undesirably places the user in close contact with high heat items as in the cooking fluid, heat resistors, and heat conducting components of a cooking device as in a rack. Thus, there is a need to accurately monitor the cooking state of the food product while avoiding the need for close proximity to the cooking device. In addition, during operation of cooking devices it is helpful to be able to have freedom to move around to different locations particularly with smokers with their long cooking times, while still providing for ready access to the current state of the device whether that be by external consideration (e.g. external viewing) at the cooking apparatus location and/or via a remote monitoring. An operator may also desire the ability to easily alter the cooking settings or characteristics of the cooking apparatus at location and/or a remote location such as increasing the temperature to shorten the time period of cooking in a smoker, etc. The prior art has not met these desired requirements relative to monitoring the cooking characteristics. For example, there exists wireless remote cooking thermometer such as represented by U.S. Pat. No. 6,811,308 featuring a hand held transmitter with plug in temperature probe and a receiver with display screen. The hand held transmitter is placed adjacent to food being cooked and the probe is inserted into the food fold being monitored. This is ill suited for cooking apparatus such as a smoker where the smoke can heat can quickly tarnish an object inserted into the smoker or electric fryers where there is not a good support location for a hand held transmitter.

U.S. Pat. Nos. 4,377,733 and 4,475,024 illustrate wireless temperature probes for a cooking utensil such as a microwave oven, while U.S. Pat. No. 4,626,662 describes a liquid cooking vessel temperature sensing system, while JP Patent No. JP62062130 to Hitachi Heating features a remote controlled cooking unit. These references are incorporated herein by reference for background purposes.

SUMMARY OF THE INVENTION

An embodiment of the invention features a cooking apparatus that comprises a heater, and a food item container that, in use, receives a food item to be heated by said heater. There is preferably included a temperature probe assembly having a food item probe, and a cooking characteristic monitoring system which includes a local cooking characteristic information conveyance visibly mounted externally on said food item container and having a first probe temperature display device. In this embodiment, the cooking characteristic monitoring system also includes a remote cooking characteristic information conveyance device which is remote to said food item container and is in remote data communication with the local temperature probe information conveyance device, and which has a second probe temperature display device.

An embodiment of the invention includes a cooking apparatus that is a smoker and with the food item container being a smoker chamber. Further, an embodiment of the invention includes a local cooking characteristic information conveyance device that comprises a control unit with a desired smoker chamber temperature setting adjustment device and an adjusted desired smoker chamber temperature display device. There is also featured a local cooking characteristic information conveyance device that comprises a probe temperature goal setting adjustment device which provides for adjustments in a predetermined value for a desired food item cooking completion temperature. Also preferably provided is a means for signaling when the probe temperature reaches the predetermined value at the remote cooking characteristic information conveyance device.

In another embodiment of the invention the remote cooking characteristic information conveyance device includes a receiver that receives data corresponding to that of the local cooking characteristic information conveyance device as to a food item probe temperature determined by the temperature probe assembly. In this embodiment the receiver preferably includes means for receiving cooking fluid temperature data and has a cooking fluid temperature data display unit, and the means for receiving cooking fluid temperature data preferably receives air temperature data of the food item container, as would be involved when the food item container is a smoker chamber.

In an alternate embodiment the means for receiving cooking fluid temperature receives liquid cooking fluid temperature data, as would be included when the cooking apparatus is an electric turkey fryer and the food item container is a cooking pot of an electric turkey fryer, with the means for receiving cooking fluid temperature being one that receives cooking oil temperature data.

An embodiment of the invention includes a cooking apparatus having the remote cooking characteristic information conveyance device including a receiver for receiving probe temperature data and a remote transmitter for adjustment of a cooking characteristic setting. This remote transmitter preferably transmits a temperature adjustment command from the remote to effect an adjustment in a desired probed food item temperature setting of the probe assembly. A preferred embodiment also has the cooking characteristic monitoring system conveying a signal when an actual food item temperature level reaches the desired probed food item temperature setting.

A preferred embodiment of the invention also features the remote transmitter as providing a temperature adjustment command which effects a desired cooking fluid temperature level adjustment in the cooking apparatus. This arrangement is well suited for use with a food item container that is a smoker chamber and with the cooking fluid adjustment command issued by said remote transmitter effecting an adjustment in the heater that alters air temperature in the smoker chamber. Alternatively, the food item container is a cooking pot of an electric turkey fryer with the heater having a heating unit in a heating relationship with cooking oil in the cooking pot.

A preferred embodiment of the invention also has the remote cooking characteristic information conveyance device communicating in wireless fashion with the local cooking characteristic information conveyance device.

An embodiment of the invention also features a cooking apparatus, that comprises a smoker chamber with a heater that heats the smoker chamber; a local cooking characteristic information conveyance device supported by the smoker chamber, and a remote cooking characteristics information conveyance device with a cooking characteristic display. This arrangement preferably also has the remote including means for bidirectional information exchange which includes means for receiving cooking characteristic information from the local cooking characteristic information conveyance device and means for transmitting cooking characteristic information to a local receiver supported by the smoker chamber.

A food item temperature probe assembly is also preferably provided with the remote cooking characteristic conveyance device receiving food item probe temperature information derived from the probe assembly.

In one embodiment the remote cooking characteristic information conveyance device further includes means for receiving smoker chamber temperature information. An embodiment also includes a remote cooking characteristic information conveyance device that preferably includes means for transmitting a desired food item probe temperature adjustment command for comparison with a temperature determined by the probe assembly, with a preferred embodiment further having the remote cooking characteristic information conveyance device as including means for transmitting an altered heater temperature to effect a change in heater temperature.

An embodiment of the invention also includes a cooking apparatus that comprises an electric heater unit, a control unit in communication with the heater unit, a cooking pot which, in use, receives cooking fluid that is heated by the heater unit, a food item temperature probe assembly, and a local cooking characteristic information conveyance device that receives food item temperature data from the probe assembly and displays received food item temperature data on a display supported by the control unit. Preferably, a remote cooking characteristic information conveyance device is provided that includes a display that displays food item temperature data determined by said probe assembly, and the remote cooking characteristic information conveyance device preferably includes a transmitter for adjusting a temperature setting associated with one or both of said heater unit and probe assembly.

A preferred method of monitoring food item characteristics under the present invention includes inserting the food item in the food item container, inserting the food item probe in the food item, and displaying in real time fashion at both the local and remote cooking characteristic information conveyance devices a read out of probe temperature.

An additional embodiment of the invention features a cooking apparatus that comprises a heater, a food item container that, in use, receives a food item to be heated by said heater, a probe assembly with food item probe, and a control unit that is supported externally in a docking station formed in the food item container. The control unit preferably has a monitoring device that includes a wireless receiver which receives, when removed from the docking station and the food item container, probe temperature data, and the monitoring device preferably has a display device that displays a current probe temperature of the food item. Also, the monitoring device preferably includes a transmitter for conveying a temperature adjustment signals to a receiver supported by the food item container with the cooking apparatus preferably having a food item container that is one of a smoker chamber or an electric turkey fryer cooker.

An embodiment of the present invention includes an electric smoker such as a smoker that has a food item temperature probe as in a meat probe with the meat temperature read out on the control panel of the electric smoker. An alternate embodiment features a meat probe with the meat temperature read out on the control panel of the electric smoker and a remote hand held device displaying meat temperature. An additional embodiment of the present inventions features a hand held device showing the smoker chamber temperature. For a smoker, the present invention also features an embodiment that has a meat probe with the temperature read out on the control panel of the electric smoker with the ability to change the temperature of the meat probe setting and electric smoker heat setting with a remote device.

An alternate embodiment of the present invention includes an electric fryer as in an electric turkey fryer with a temperature probe as in a temperature probe with the temperature read out provided on the control panel of the electric turkey fryer. An alternate embodiment features a food item temperature probe with the temperature read out on the control panel of the electric turkey fryer as well as a remote hand held device displaying the temperature. An additional embodiment features a hand held device showing the temperature of the oil and the meat exclusive of the read out on the control panel. In addition, an embodiment of the present inventions features a meat temperature probe with the meat temperature read out on the control panel of the electric turkey fryer with the ability to change the temperature of the meat probe setting and the electric turkey fryer setting with a remote device or, a remote device that has the capability both to convey the information and alter settings in the cooking device with or without the inclusion of a means to convey the information on the cooking apparatus structure associated with the remote.

BRIEF DESCRIPTION OF THE DRAWINGS

FIG. 9 shows the electric fryer of FIG. 8 in assembled condition including a functioning (e.g., plugged in) probe assembly received by its releasable (hand removable) control unit assembly with control unit and heat resistance element combined;

FIG. 10 shows the fryer of FIG. 9 with the lid and basket removed for a better view of the cooking pot interior;

FIG. 11 shows the probe assembly of the present invention (with an alternate or supplemental connection embodiment designation within a dash line demarcation circle);

FIG. 11A shows the alternate or supplemental connection embodiment shown in the demarcation circle in FIG. 11 in greater detail and in a separated state;

FIG. 15 shows in cut away an embodiment of a smoker with a cooking characteristic information exchange system with local cooking characteristic information conveyance device with temperature display device in the form of a smoker chamber cooking fluid temperature display with unidirectional transmitter and a remote cooking characteristic information conveyance device comprising a remote receiver with similar information cooking fluid temperature display device;

FIG. 16 shows in cut away a smoker having a cooking characteristic information exchange system in the form of a local cooking characteristic information conveyance device having a probe assembly and probe assembly food item temperature display device.

FIG. 17 shows in cut away an embodiment of a smoker having a cooking characteristic information exchange system comprising a local information conveyance device unit which conveys both smoker chamber temperature and probe temperature.

FIG. 18 shows an embodiment of a cooking apparatus information exchange system comprising a local and a remote information conveyance device unit that include local and remote smoker chamber temperature display devices and bi-directional wireless interaction.

DETAILED DESCRIPTION OF THE INVENTION

Figure 1:
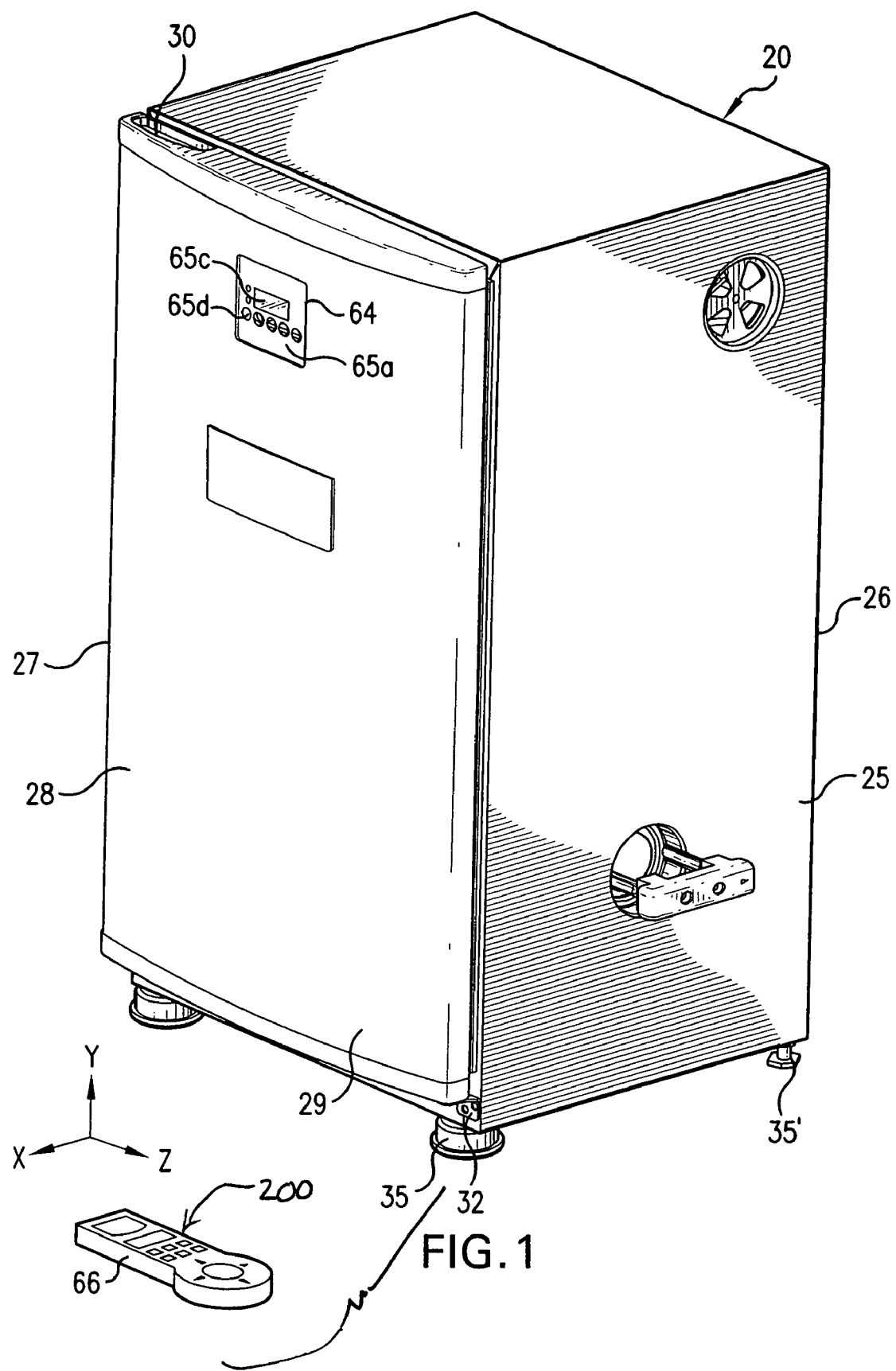
FIG. 1 shows a perspective view of the smoker of the present invention with front door closed and cooking characteristic information exchange system having local and remote cooking characteristics information conveyance devices featuring a controller and monitoring device (e.g. food temperature and/or smoker chamber temperature)
Figure 2:
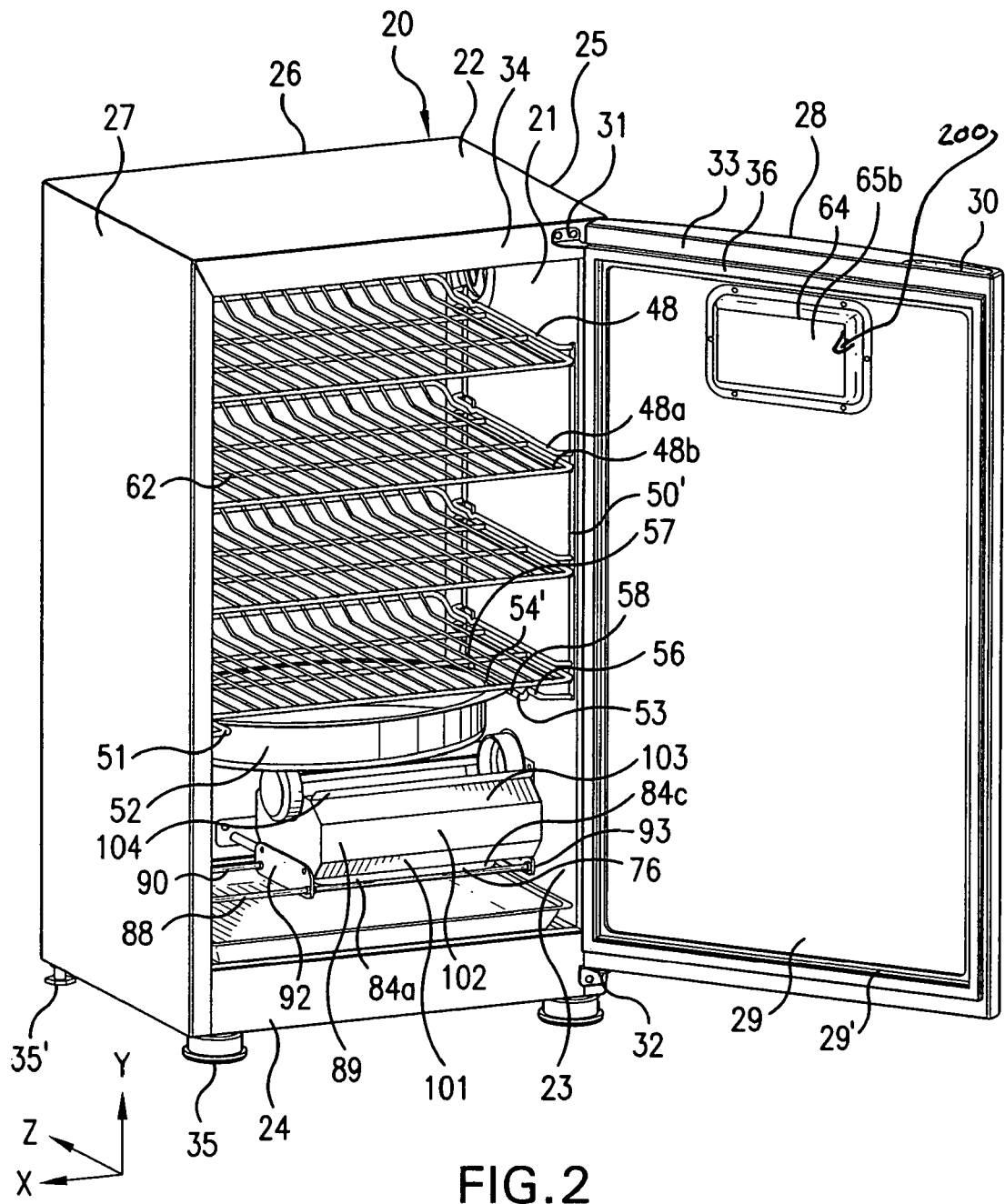
FIG. 2 shows a perspective view of the smoker with front door open.

FIGS. 1 and 2 illustrate smoker cooking apparatus 20 ("smoker") with FIG. 2 showing door 29 swung open for viewing the interior 21 of housing 22 comprised of main housing section 23 and base housing section 24. In the illustrated embodiment, smoker cooking apparatus 20 has a rectangular side wall configuration comprised of side walls 25, 26, 27 and 28. Side wall 28 is partly (or entirely) comprised of door 29 shown in FIG. 2 as having grasping handle 30 (upper edge positioning) and is supported by an upper and lower hinge assembly 31, 32 with the lower edge of the door being shown below the border between the base housing section 24 and the main housing section 23 in refrigerator door fashion.

As shown in FIG. 2, the periphery 33 of door 29 and/or corresponding edging 34 of housing 22 are designed for an airtight fit which is facilitated by seal 36 which preferably is secured within a recessed edge 29' of the door's periphery cavity. Seal 36 is arranged to partially extend out of the cavity of door 29 to assume a compression seal relationship relative to the contacting edging 34 of housing 22. Door 29 is also preferably maintained shut by an engagement device as in a magnetic attraction arrangement with a preferred embodiment being an internalized magnetized sealing strip as in an integrated magnetic material and elastic seal material combination that comes into releasable engagement with a magnetic attraction material at housing edging 34. Alternatively or in addition thereto, a magnetic or non-magnetic assembly is provided at a corresponding peripheral location on the door and housing main body for door closure-retention as in a mechanical latch assembly or electronic solenoid clasp bar, etc. In one embodiment an electronic, preferably with a local and/or remote operation function and/or mechanical key code device, is utilized. This arrangement provides a childproof safety function.

FIGS. 1 and 2 further illustrate two foot pad sets 35, 35' of two different types extending down into ground contact from the corner undersurface of base housing section 24 and one or more are preferably individually adjustable to accommodate uneven ground support surfaces (e.g., threaded post and fixed not support). The foot pads in the front are preferably provided with covers for improved appearance and user contact protection.

Figure 4:
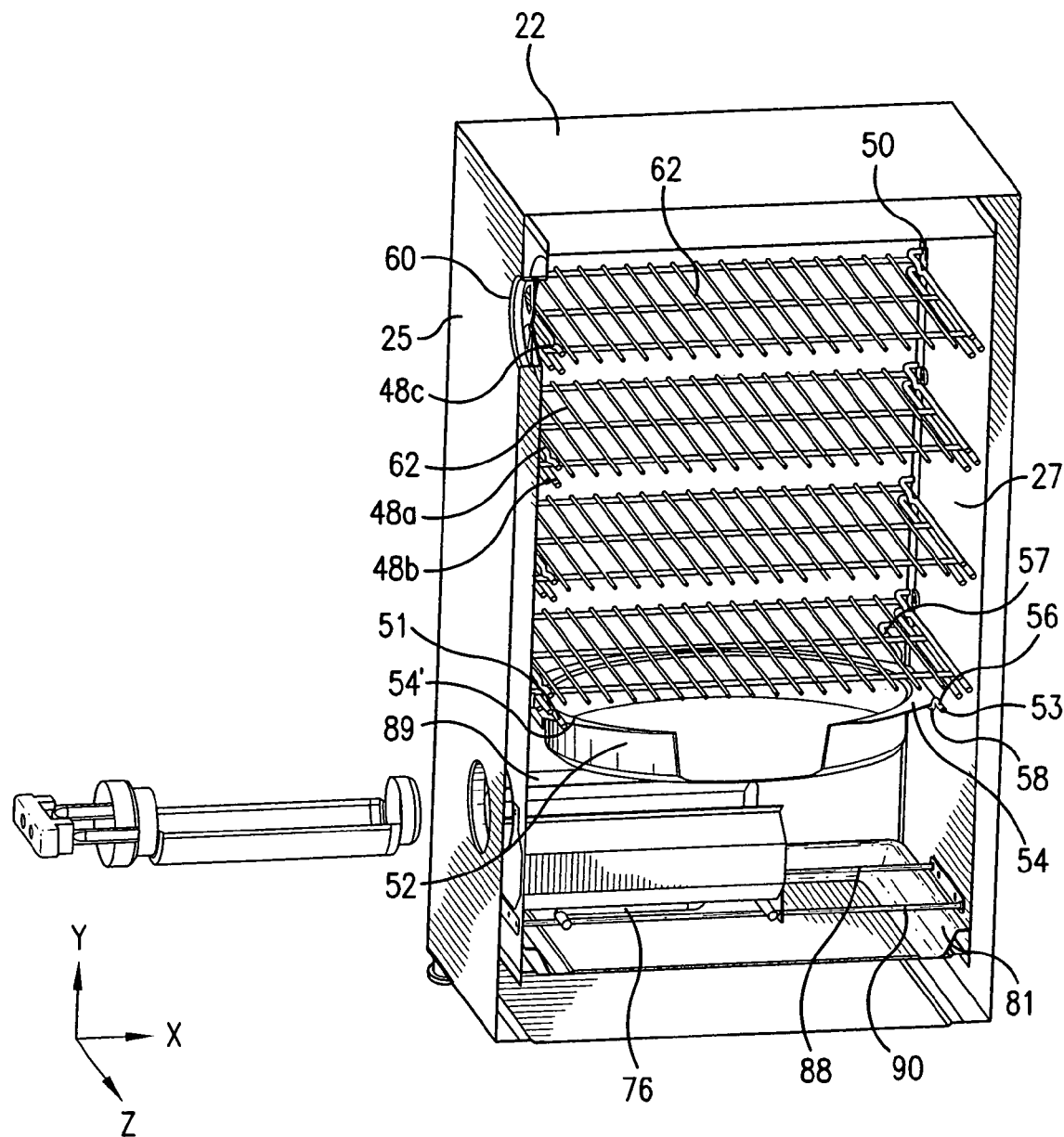
FIG. 4 shows a partially cut-away left side perspective view of the smoker with loader removed.
Figure 5:
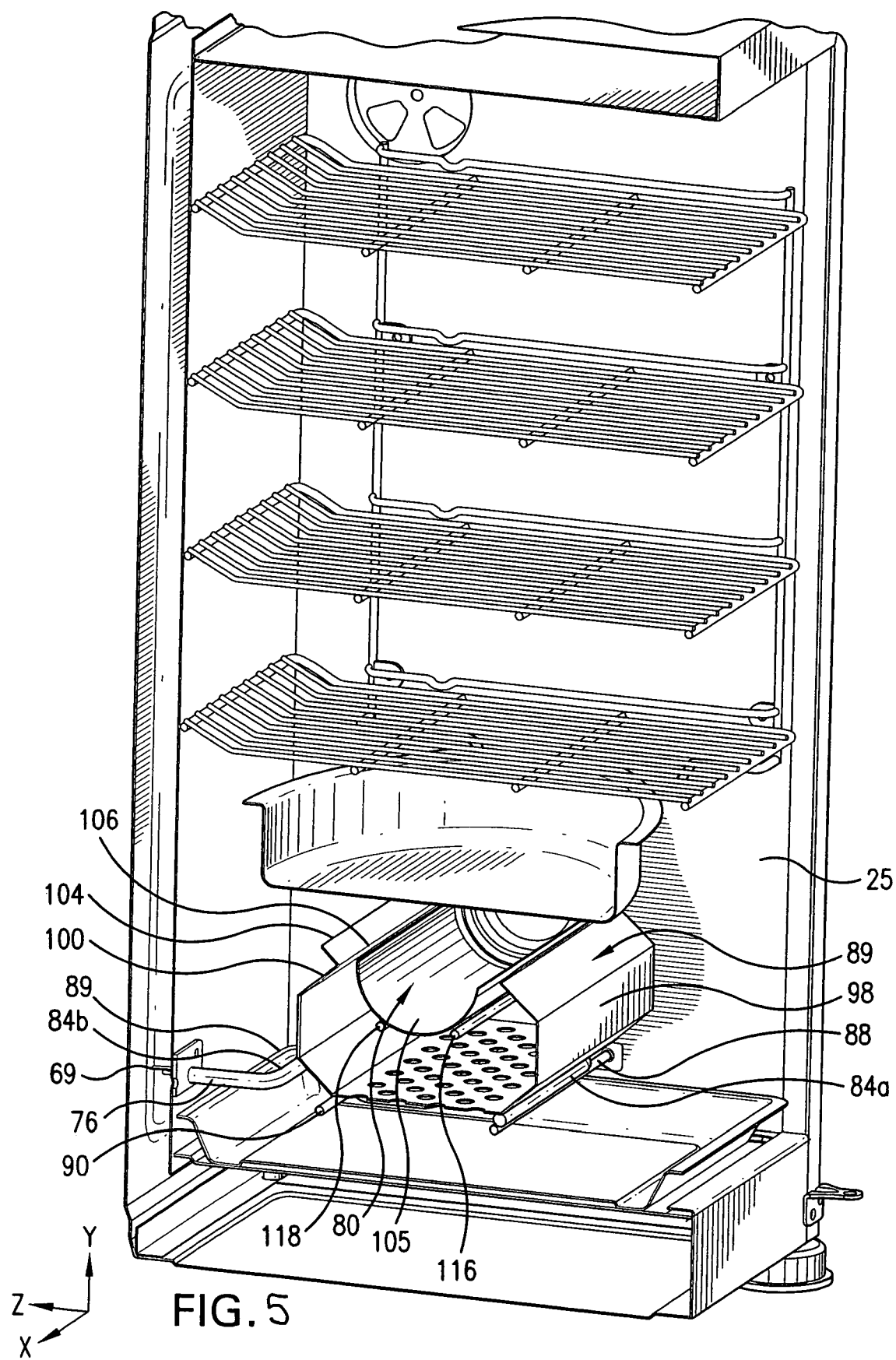
FIG. 5 shows an interior view of the smoker with left and front wall removed.

As represented by the partial cut-away views in FIGS. 4 and 5, each of the walls (front (including door), back, left and right sides, top, and bottom) preferably are each in the form of a double wall panel assembly with, or without insulation therebetween such as one or more sheets of insulating and heat resistant foam (e.g., a blown-in foam insulation panel) or non-woven fiber material or some alternative solid insulation means or, alternatively, reliance is placed on an air pocket alone. The outer wall is preferably formed of a material suitable for the high heat environment and potential outdoor use or exposure as in stainless steel or a plastic or a composite material. The interior wall material is formed of a heat resistant material which can be of a similar or a different material as its exterior counterpart.

Figure 3:
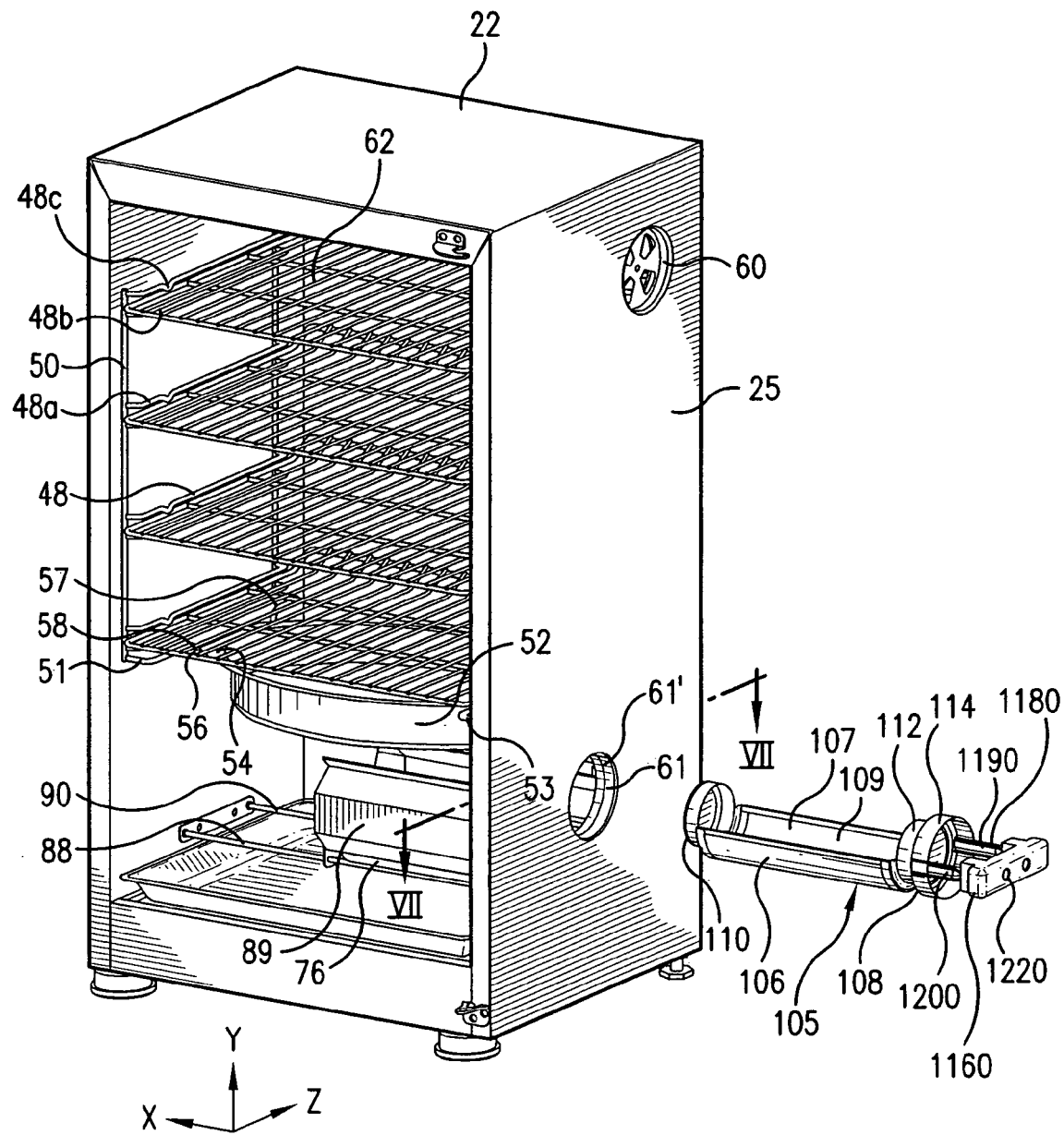
FIG. 3 shows a right side perspective view of the smoker with front door removed and loader removed.

FIGS. 2 to 4 illustrate food rack slide supports 48 each comprised of an upper and a lower slide slot defining rung 48a, 48b with the upper rung preferably having an inner, downwardly extending capture projection 48c (FIG. 3). The rung sets on each wall are preferably formed together with a common back base (50, 50') secured with screws to respective interior wall surfaces of housing 22. Back bases 50, 50' supports a lower positioned pan support rung sets 51, 53 that support opposite sides of water/drip collection pan 52. A preferred pan 52 support arrangement features left and right pan support rung sets 51, 53 each having front and rear outer sections 56, 57 and a dipped central section 58 which receive corresponding sized flanged extensions 54, 54' of pan 52 for securing in position pan 52. Pan support rungs 51, 53 are also preferably integrated with the back base 50, 50' to provide monolithic rack bodies for securement to the noted opposing interior walls. Four individual food racks 62 are shown slidingly received within opposing food rack slide supports sets 48 above pan 52.

With reference to FIGS. 3 and 4 there is shown through hole or port 60 formed in an upper, back region of side wall 25 which provides exhaust and/or intake port means for exhausting combustion waste gases and/or providing an oxygen intake. Although not shown, an additional embodiment of the invention includes an aperture opening and adjustment cover assembly as in one having an inner aperture plate that is fixedly supported and a second aperture plate that is pivotably adjustable (e.g., with an outer finger flange and central pivot relative to the first aperture plate). In this way an adjustment to a desired full opening setting with fully corresponding apertures or a partial setting with partially corresponding apertures or a closed off setting wherein the apertures of the outer plate are between apertures of the inner plate is made possible. In addition port 60 also provides a suitable ducting location for gas passageway as in a duct extending from an internal relatively closed off environment (e.g., house or shed) to a less closed in environment. As shown in FIG. 2, there is further provided base pan 81 (e.g., an ash pan) which provides a final drip and ash capture means and can be slid in and out along the upper surface of floor panel 71 when the door is open and the smoker sufficiently cooled.

Figure 6:
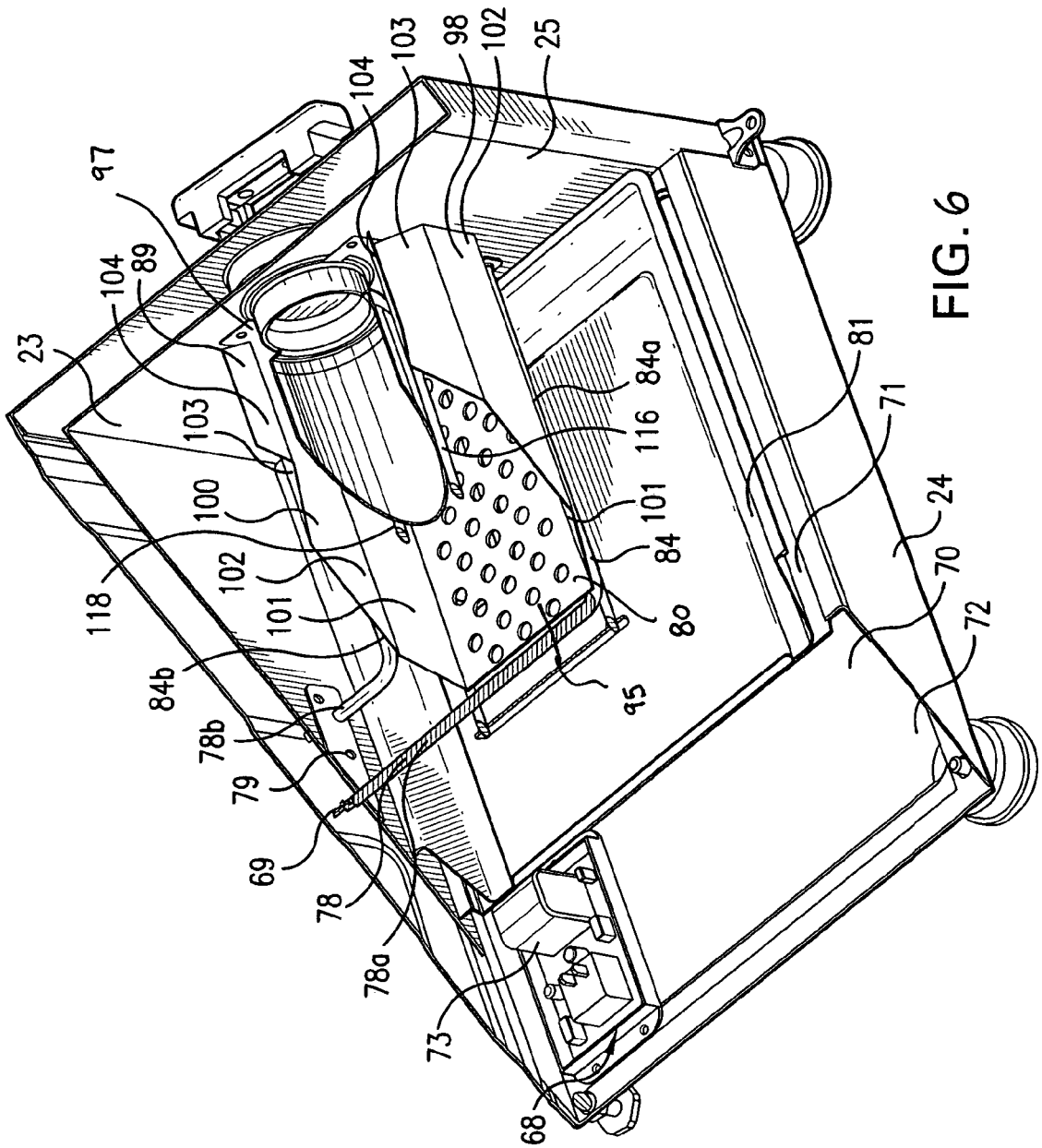
FIG. 6 shows in cut away the base portion of the smoker.

FIGS. 1 and 2 further illustrates control panel assembly 64 having front panel face 65a and a rear (internal) panel face 65b (control panel assembly 64 probably comprises both visual indicators (e.g., temperature and time visual indicators) 65*c* (e.g., LED displays or mechanical dials, etc.) and smoker character adjustment means 65*d* to alter, for example, the smoker duration time, the desired temperature setting(s), an "on/off" functioning arrangement, a key code if an electronic door lock is utilized, etc.). The cooking time settings and temperature settings are also preferably adjustable via a remote device (e.g., activator) 66 shown in FIG. 1, which sends direction signals either directly to control panel assembly 64 or indirectly via control assembly 68 (FIG. 6) with the latter preferably including electronic components for time adjustment means, power line input etc. This embodiment of a cooking characteristic information exchange system is preferably a digital system. In this embodiment, to streamline the door control panel assembly, there is provided control assembly 68 shown in FIG. 6 as being within the false bottom compartment 70 formed between floor panel 71 forming the bottom of main housing section 23 and panel 72 forming the bottom of base housing section 24. Control assembly 68 is further shown mounted to panel 72 of base housing section 24. All of the control means can be placed, however, in one unit or divided as by, for example, function. For example, for remote activation, transceiver/receiver assembly 73 shown in FIG. 6 is provided as part of control assembly 68, although various alternate local cooking characteristic information conveyance devices featuring, for example, signal receiver and/or transmitter arrangements are featured as in a combination transmitter/receiver or an independent transceiver and receiver arrangement fuiiy positioned within the door supported control panel 64. Preferably a wireless, digitally based communication system is utilized to achieve the adjustment and monitoring of the smoker characteristics as in time, temperature and on/off status, loader adjustment, etc. as described above through use of either or both of control assembly 68 and control panel 64. Further, the transmission reception function is preferably bi-directional with, for example, the remote 66, having a display to provide smoker characteristic displays on a real time basis as in status information of the current smoker chamber temperature and/or smoker time remaining and/or probed food item temperature level as well as a transmitter for adjustment of one or more of cooking characteristics as in the noted smoker chamber temperature and/or smoker time allotted and/or probe temperature setting. Accordingly, there is featured a high functioning cooking characteristic exchange system which provides both a monitoring function via suitable displays but also a control function that is facilitated by the bi-directional data transfer relationship. The present invention also features alternate cooking characteristic information exchange means as in a single directional arrangement wherein the remote does not have a control function but a display function only and/or the display is not present on the smoker supported, local cooking characteristic information conveyance device but only on the remote cooking characteristic information conveyance device 66. (e.g., smoker chamber temperature and/or probed food item temperature is displayed on the remote). An alternate embodiment features a remote free cooking characteristic information exchange system with only a local cooking characteristic information conveyance device having, for example, a smoker chamber and/or probed food item temperature display on, for example, local display device 65*c*. As explained in greater detail below the cooking characteristic information exchange system preferably involves real time cooking characteristics as in temperature levels of the one or more food items (e.g., multiple probes for monitoring multiple food items and sending out digital system based signals either simultaneously displayed or toggled in a desired sequence at the display device) within the smoker whereupon a signal is generated and sent out to a remote monitoring device as in remote 66 in FIG. 1 or 66' in FIG. 7 or 66" in FIG. 8. A preferred smoker temperature range is 200 to 400° F. with a 275 to 325 range being well suited for many recipes and a 300° F. setting being illustrative of one used in many recipes. Accordingly, the local and/or remote display device should have a range that can handle the extremes of any potential temperature reading for the type of cooking apparatus as in a 150 to 350° F. temperature range being illustrative.

Control assembly 68 further preferably includes a heating temperature control system such as those used to control the temperature of conventional ovens (e.g. via current to resistance adjustments). Heating temperature control 69 (FIGS. 5 and 6) is placed in communication with a heat source as in the illustrated heat resistance bar 76 preferably by direct wiring between control assembly 68 and heat resistance bar 76 or directly or indirectly by data communication between another local receiver as in one mounted in the control panel in wired or wireless communication with control assembly 68 (indirect) or control 69 (direct) associated with the resistancy wire. As shown in FIG. 6, heat resistance bar 76 has an L-shape loop configuration with a shorter bar section 78 comprising two parallel bar sections 78*a*, 78*b* extending out from support plate 79 and has electronic connection terminals (not shown) extending into communication with control assembly 68 which includes means for altering the current supply in the bar to alter the temperature of the heater and preferably also a temperature level sensor to compare to and maintain a preset temperature once a desired level is set.

The first leg set 78 of resistance bar sections (78*a*, 78*b*) is shown in FIG. 6 as extending internally into the smoker apparatus away from back wall 26. The second leg 84 of the heat resistance bar 76 comprises a second set of parallel resistance bar sections (84*a*, 84*b*) extending transversely off from unequal length sections 78*a*, 78*b* to define the overall L-shape loop construction. Bar sections 84*a*, 84*b* extend toward side wall 25 near where the L-shaped heat resistance bar coil is completed by way of an end cap heat resistance bar loop section 84*c* (FIG. 2) extending between the free ends of 84*a*, 84*b*. Heat resistance bar 76 extends out from its support location at support plate 79 into a suspended, cantilever state within smoker chamber 21 relative to the interior surface of the housing walls. The cantilever arrangement is preferred together with a direct contact relationship with the smoker material recover tray 89 but not preferably a resistance bar support of the receiver tray arrangement. Rather, additional support rods 88 and 90 are preferably provided to provide the bulk of support to the receiver tray. While a heat resistance coil embodiment is preferred for an electrical based embodiment of the present invention, alternate electrical based heating units such as infrared ceramic plates heaters or electromagnetic wave heaters (e.g., infrared and microwave spectrum wave levels) are also featured under the present invention. Alternate heat sources such as non-electric heat sources (e.g., combustion as in charcoal and coal with associated combustion material support tray or the like) are also featured under the present invention.

As shown in FIGS. 2, 3 and 5 support rods 88, 90 extend parallel with section resistance bar sections 84*a*, 84*b* and into fixed engagement at opposite ends of housing walls 25 and 27 and are shown spaced away from sections 84*a*, 84*b* to avoid direct contact therewith. Support rods 88, 90 provide a stable base for supporting smoker material receiver tray 89. As shown in FIG. 2, interior brackets 92, 93 extend across at respective spaced apart locations along the length of fixed support rods 88, 90, with the main internal bracket 92 being in a central region of the housing chamber and bracket 93 being closer to the interior wall as in a direct contact relationship. As shown in FIG. 2, at a lower end of bracket 92, rods 88, 90 extend through receiving apertures provided in bracket 92 to support the bracket 92. The upper region of bracket 92 is secured to interior end wall plate 96 of receiver tray 89. Although bracket 92 and plate 96 are shown as secured individual components alternate load support means are also featured under the present invention as in monolithic plate structure, vertically extending support bars, etc. There is also preferably provided a corresponding end tray plate 97 shown in FIG. 6 in a preferred direct contact arrangement with the interior surface of wall 25. FIG. 6 illustrate a preferred arrangement for base plate 95 of receiver tray 89, which includes a series of apertures 80 to provide for ash drop into base pan 81. First and second brackets 92, 93 are secured to the ends of apertured base tray plate 95, with bracket 93 being an angle bracket with flange extension providing below plate 95 support and bracket 92 fixed either directly or indirectly via end tray plate or end shield 96 (FIG. 2) in transverse fashion to the horizontally oriented base tray plate 95. The support arrangement is also such that the smoker material receiver tray 89 is in direct contact with heat resistance bar 76 which facilitates heat transfer with side wall shields 98, 100 extending upwardly up from or the elongated sides of apertured base plate 95. Thus a preferred arrangement for smoker material receiver tray 89 comprises an enclosure defined by one or more end tray plates or end shields 96, 97 (e.g., the interior surface of wall 25 can be used in place of plate 97 if sufficiently robust) side shields 98, 100 extending between and in contact with end plates 96, 97 and base plate 95 which is preferably apertured to provide for gravity release of waste products as in ash from smoker material combustion (preferably a slow smoldering smoke generating combustion). Apertured base plate on which smoke generating material is placed is preferably positioned in close proximity with the heat generating source as in 0 to 6 inches with 0 representing the aforementioned direct contact relationship and more preferably 0 to 2 inches as in less than 1 inch spacing. For situations where non electric heat generating means material is utilized as in a heat supply based on a combustible such as charcoal, the support surface in the housing which receives the combustible material is arranged so as to place the combustible in close spacing with the smoke generating means as in 0 to 6 inches with "0" including either direct contact with the combustible in use with the apertured plate 80 or alternatively the common usage of apertured plate and receiver tray 89 in general as recipient of both the combustible and smoke generating material in a direct contact, intermingled, relationship.

The preferred heat resistance bar/tray contact arrangement places each of the long edges of an apertured, rectangular base tray plate 95 in contact along their full length with the respective, adjacent resistance bar sections 84a, 84b and/or shields 98, 100, which extend vertically up from the tray plates long edges. In this way, there is an extended length of direct contact heat conduction to base plate 95, and/or shields 98, 100 (depending on relative positioning of each). Shields 98, 100 are shown to be multi-paneled shields, that include opposing, mirror image opposing panel schemes. The illustrated shields 98, 100 each comprise panel sections (101, 102, 103) which are best shown in FIGS. 5 and 6, as well as an upper, outer breakout panel section 104 which, in conjunction with the immediately below supporting panel 103, defines elongated "V" shaped shield rims on each side with apex edges. The opposite end of shields 98, 100 is preferably fixed (e.g., directly or integrated as in a monolithic stamped plate) to the interior surface of wall or to an adjacent bracket. Base plate 95 is further shown to be the upper component in overhead stacking arrangement of rods 88, 90 at the lower level, and intermediate heat resistant coil 76 preferably spaced above rods 88,90 and an above positioned base plate 95 shown in contact with heat resistance coil 76.

Receiver tray 89 is arranged for receipt of smoker material from loader 105 with loader 105 preferably being in a nested arrangement within receiver tray 89 as well as preferably in a support relationship as with end receiver tray plate 96 providing an interior support surface (e.g., in a sliding contact concave upper edge support arrangement). The housing itself also preferably provides additional support to the loader as in opposite loader end contact via the loader reception surface of housing 22 defining aperture (61, FIG. 3), which aperture 61 further provides an insertion and retraction location for loader 105. Aperture 61 is shown provided in wall 25 to have a degree of vertical height overlap relative to shields 98, 100 once inserted. For example, with a preferred circular aperture 61, the aperture's positioning is preferably arranged relative to the shields such that the shields extend up to the upper half way point of a vertically oriented diameter line defining aperture 61. In addition, the shields 98,100 preferably are spaced apart greater than that diameter, with the upper rims 104 defining a receiver tray constricted portion (minimum spacing location) which is preferably slightly larger than the aperture diameter (e.g., less than a ½ inch and more preferably less than a ¼ inch) and which define a limited clearance space an each side for a centered circle defined by said diameter and positioned an equal amount to opposite sides of the mirror image rims 104 with constricting edges 106. The constricted arrangement provides a degree of heat containment relative to inserted loader and receiver tray combination 80 (FIG. 2), which are preferably arranged with nesting components.

As shown in FIG. 3, loader 105 of combination 80 includes loader main body 107 which features a recessed load area 109 designed to receive smoker material for introduction to receiver tray 89. In a preferred embodiment the loader's main body 107 comprises a semi-cylindrical vessel 106 with an upward facing concave cross-section and end caps 108, 110 designed to generally conform to the aperture size 61 as to allow for a sliding in of the loader 105 without extensive spacing. For example, a smooth sliding arrangement wherein the end cap is designed for a sliding friction fit and a general sealing effect once loader 105 is inserted into its dump ready or fully inserted position shown in FIG. 5 (absent smoker material to dump for added visual clarity). The preferred supporting arrangement for loader 105 involves end cap 108 in a supporting relationship with housing edging defining aperture 60 in wall 25 (e.g., a double wall panel with or without or partially bridging flanging with a full bridging flange 61' shown in FIG. 3). Preferably, the axially spaced edging of the interior and exterior wall panels for wall 25 provides a spacing which results in the end caps 108, 110 extending across the respective wall panel spacing of wall 25 or therepast.

End caps 108 and 110 (FIG. 3) also preferably have an axial thickness so as to assume a cylindered ring from such as one conforming to the axial thickness of the double wall panel cylindrical aperture 61. In a preferred embodiment end cap 110 is a two stage end cap with a first cylindrical ring 112 and a second cylindrical ring 114 larger in diameter from the first ring with the larger diameter ring having the above described generally conforming diameter to that of aperture 61 to provide support and also sufficient surface area to provide a secure location for handle 1160 (FIG. 3) which in the illustrated embodiment comprises a U-shaped bracket 1180 having extended legs 1190 and 1200 fixed (e.g., a weld or some other permanent or releasable (screw) securement means) to the interior annular surface of cap section 114 (so as to avoid interference with a smooth rotation and substantially sealed off arrangement between the exterior surface of cap section 114 and the receiving surface defining aperture 61). The central bridging portion of U-shaped bracket 1180 provides an attachment base for handle grasp 1220, preferably formed of a lower heat conductivity material as in a wood or plastic grasp. Handle 1160 also preferably has an elongated configuration with a length preferably equal to the maximum housing loader reception aperture width (e.g., diameter of aperture 61), which length provides for full hand grasping between legs 1180 and 1200).

In addition, side wall shields 98, 100 extend up to vertically overlap (e.g., a partial or full overlap) both main body 107 (e.g., the upper side edges of body 107 which are substantially horizontally coincident with the mirror image V-shaped rims' apex edges 106) representing the innermost extension portion of shields 98, 100).

As seen from FIG. 3, loader main body 107 preferably has a true semi or half cylindrical configuration with the smoker material supporting main body 107 occupying ½ of a full cylinder which is designed to provide a smoker material loader capacity sufficient for handling intended usage for the preferred single load dump for resupply during a smoker cycle (e.g., a ½ to 5 lb. bag smoker material reception volume (e.g., one or two) as in a 1¾ lb. smoker chip bag insertion capacity without overflow from the recessed loading area 109 of the loader main body 107. For example, a 3 inch to 1 foot diameter main body with ½ foot to 2 foot axial extension between end caps (108, 100) is illustrated of a preferred loader body size, although various other sizes are featured under the present invention based on desired needs of the operator and configuration of the smoker in general. End cap 108 extends deepest into the smoker when loader 105 is fully inserted in a rotary support arrangement. With loader 105 fully inserted, the opposite end cap 110 is designed to plug insertion/retraction aperture 61 and generally seal off aperture 61. End cap 110 is preferably sized either the same as ring 114 for easy initial insertion or of common size with the larger ring 114 to provide a retracted loader (but not removed from housing) support and plug seal arrangement.

As shown in FIGS. 5 and 6, for added stability, extension rods 116, 118 are provided and extend within the confines defined by shields 98, 100 and are further preferably arranged to extend from a first fixed support location at the interior surface of wall 25 (or end tray plate 97) to end tray plate 96 supported by the vertically extending bracket 92 through which rods 98, 100 extend. Extension rods 116, 118 are spaced apart so as to be positioned in lower quadrant regions of the loader tray main body and are designed to not obstruct rotation freedom for main body 109 or interfere with the smoker material unloading process described below. The extension rods 116, 118 provide an added degree of structural integrity to receiver tray 89 and are preferably spaced away (e.g., within a ½ inch) but relatively close to loader main body 107. A closer, slide contact arrangement (not shown) is also featured under the present invention to provide additional body support to the rotating main body 107.

The present invention features a resupply process that includes:

a) Supplying smoker material SM to loader 105 as in opening a bag of smoking material "SM" and pouring smoker material into the main body 107;

b) aligning the rotation axis of the loader with the center of aperture 61 with the loader positioned for smoker material retention (e.g. the semi-cylindered main body's top opening facing upwards);

c) sliding loader into aperture 61 and into chamber 21 of smoker housing 22 which involves, with the loader position continuing to be in a smoker material retention position, sliding of the loader into the housing until receiving a preferred or plug aperture relationship wherein aperture 61 is essentially closed off by end cap 110 of loader 105;

d) adjusting (e.g., rotating) loader 105 (as in a 180° rotation) to remove smoker material SM from loader 105 for receipt within receiver tray 89 (e.g., a turning upside down of loader 105 through rotation to enable smoker material SM to drop of freely out into a below position and receiver tray 89) and preferably continuing to return loader 105 back into its original "no dump" insertion orientation;

e) retaining the inserted loader in position during the smoking process (preferably while retaining a sealing plug relationship return to aperture 61) following dumping and either following a return to the original no-dump loader position or while the loader remains in the dump orientation.

The present invention also comprises retracting the loader following the above sequence (e.g., a complete withdrawal and removal of loader 105 from the housing or a non-full withdrawal or retraction as in a switching of locations of end caps 108 and 110 relative to the side wall 25 section defining aperture 61). The end caps preferably having a common exterior maximum section (e.g., diameter) to provide a common plugging effect at each position. Following loader retraction additional smoker material SM can be loaded either for use in a subsequent smoker process or cycle (the loader preferably being sufficiently spaced at both an inserted state and a retracted state from heat source 76 to avoid smoking of the smoker material SM until dumped to receiver tray 89 or a resupply dumping process is scheduled in accordance with the above described receiver tray resupply of smoker material during a common food smoking cycle.

Thus, the smoker material SM is loaded within main body 107 and filled to generally below the upper edge of the end caps or sufficiently low enough to avoid insertion complication relative to aperture 61. Once inserted, the handle grasp indicia (e.g., RM) reference (e.g., points) to the load status based on a readily observable (smoker material on top of main body 109) user insertion. To achieve an unloading of the wood chips, an operator grasps the handle grasp 1160 and rotates the loader sufficiently to have the smoker material SM contents drop into the receiver tray below such that the smoker material smokes (e.g., smolders) due to the heat provided by the heat source as in heat resistant coil 76' and the low oxygen environment in the smoker chamber 21. The open top of the main body 102 provides for ready release in the illustrated embodiment and a 180° rotation is preferred with or without rotation stops (e.g., a 180 one-way as in clockwise, then 180 the opposite way, as in counterclockwise sequence, or a continuous 360° turning cycle in going from loaded-unload-ready to load status). In addition, the arrangement of the heat shields 98, 100 as in the above described nesting relationship helps avoid smoker material spill outs as the closeness and configuration of the tray 89 (e.g., V-shaped rim arrangement 104) helps retain the smoker material SM until the desired point of loader dump positioning (e.g., fully rotated upside down so that the wood chips fall directly into tray 89 with the bottom surface of the loader main body capping the reception region). The central axial axis of loader 95 (commensurate with the illustrated rotation axis) preferably falls on common vertical plane with the central bisect axial line for tray 89 such that the smoker material drops along the vertical plane once the open topped loader is flipped. Thus, with the ability to reload without opening the smoker there is avoided heat loss and there is lessened the chance of potential user contact with a heated component within the smoker. The ability to monitor and/or control externally with a cooking characteristic information exchange devices as in that shown in FIG. 1 with remote 66 further facilitates the ability to keep a close eye on the process without having to open the smoker during the long cooking process.

Figure 7:
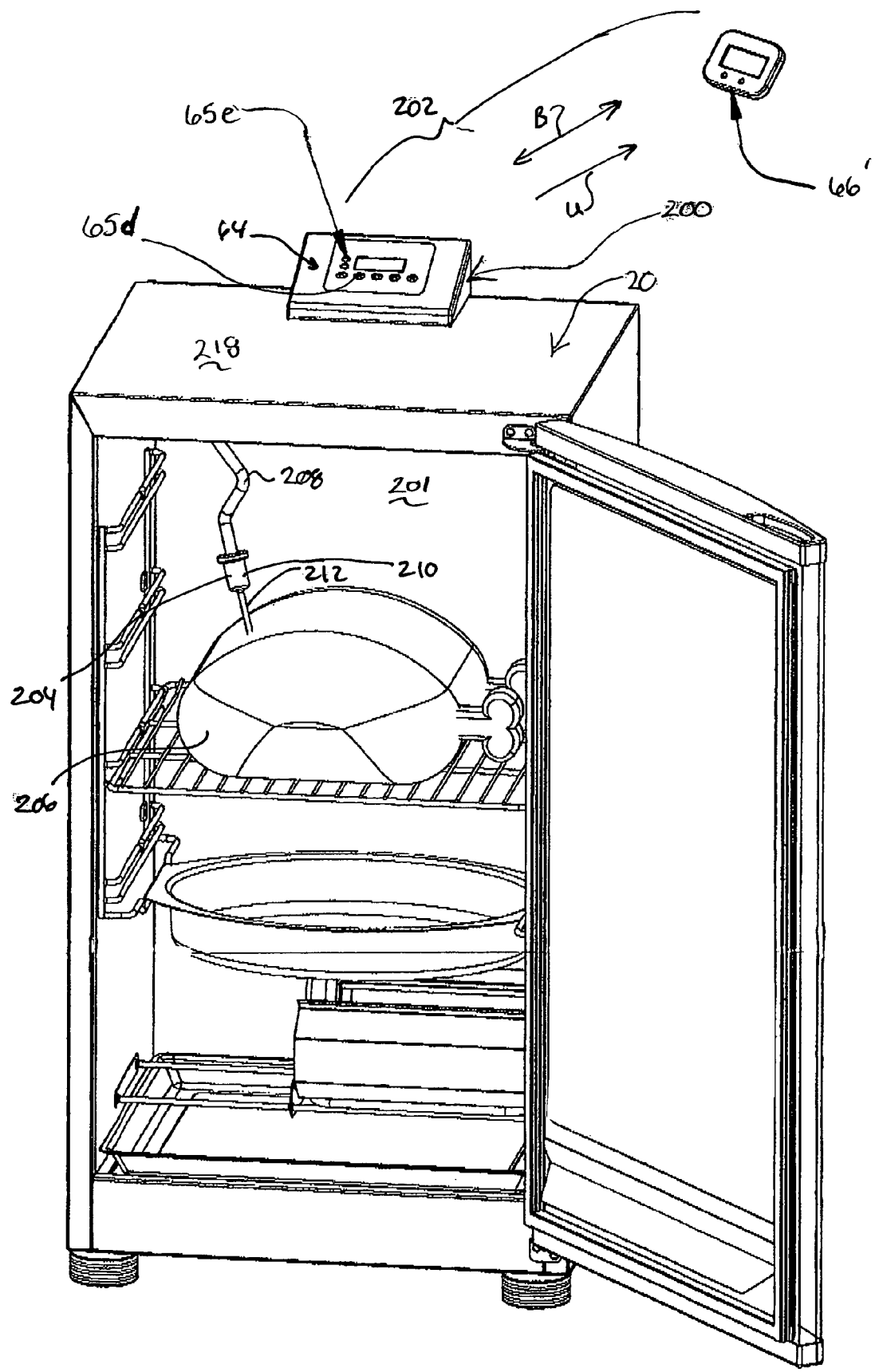
FIG. 7 shows an alternate embodiment of the smoker with cooking characteristic information exchange system which includes a temperature probe assembly and local and remote cooking characteristic information conveyance devices.

With reference to FIGS. 1, 7 and 15-23 there is provided additional discussion of preferred embodiments of cooking characteristic information exchange system 200. FIG. 7 shows control unit or control panel assembly 64' mounted externally, like in FIG. 1, to the smoker chamber 201 as in the illustrated door (FIG. 1) or a top panel 218 (FIG. 7) mounting of the control panel assembly to be both visible and at a location that avoids contact with the heated cooking air (fluid). The mounting is preferably a fixed, permanent mounting to the smoker exterior wall structure (e.g. in a recess provided in the door as in FIG. 1 or secured to the top panel 218 as shown in FIG. 7. As seen also from FIG. 7, there is placed within the smoker chamber food item 206 (turkey shown) which is to be subjected to a smoking process. Control panel assembly provides a local cooking characteristic information conveyance device component of information exchange system 200, which system 200 is shown in FIG. 7 to further comprise food item temperature probe assembly 204 having, for example, food insertion probe needle 212 extending from probe base 210. From base 210 extends probe-to control unit communication link 208 which preferably is formed by a high temperature flexible electric cable; although a variety of alternate communication linkage means is featured in the present invention as in fiber optic line communication or a wireless communication as in the wireless temperature probe system described above in U.S. Pat. No. 4,377, 773. However, due to the smoke environment associated with smoker chamber 201, the illustrated fully flexible wire or cable connection 208 is preferred. Communication link 208 preferably extends into control unit 64' (preferably representing or comprising a local cooking characteristic information exchange device) which is powered either by the same source used for powering the heater unit (home outlet plug in source for example which is not shown) or is a stand alone powered source as in a battery operated control unit.

FIG. 7 also illustrates cooking characteristic information exchange system 200 as being an embodiment comprising a cooking characteristic monitoring system 202 featuring both the noted local cooking characteristic information conveyance device 64' as well as remote cooking characteristic information conveyance device 66' which communicate preferably by a wireless unidirectional "u" or bi-directional "b" communication system with the information exchanged preferably including probe temperature and/or cooking fluid (current smoker chamber air) temperature settings. In addition, as explained below, in a preferred arrangement, remote information conveyance device 66' not only displays one or both of the temperatures (food item and/or smoker chamber), but also can be used to send control signals to adjust a preexisting preferred smoker chamber temperature setting and/or food item probe temperature desired setting to a new desired setting(s). The bi-directional arrangement noted above is preferred for this arrangement wherein the local and remote information conveyance devices each display one or both of the noted temperatures (or some alternate cooking characteristic value) and the remote conveyance device is used to trigger the noted setting adjustments (either alone or in conjunction with a similar ability in the local information conveyance device such as the use of the noted adjustment buttons 65d). In an alternate embodiment each or only one of local and remote information conveyance devices is provided with a key pad or the like, which, for example, is used to adjust temperature levels and/or as an access code generator in the event a number lock is provided to limit access to the heated smoker interior.

The local information conveyance device 64' (and/or remote conveyance device 66') also preferably include the feature of means to toggle between remote activation and remote deactivation. For example, FIG. 7 illustrates button(s) 65e which can be used to toggle between remote feature capability mode (e.g., a mode where the local information conveyance device generates a data transfer signal as in a wireless date communication signal that is preferably digital based) for reception by the remote device 66' and remote feature disabled mode where information is not sent out to the remote device (e.g., a situation where the wireless signal generator is disabled—see for example the bi-directional remote controlled transmitter/receiver circuitry shown in the above noted JP62062130).

FIG. 15 shows cooking characteristic information exchange system 200 in an embodiment that is probe assembly free and features a unidirectional information conveyance monitoring system 220 which is cooking fluid temperature based. As shown in FIG. 15 system 220 features a cooking fluid temperature sensor 222 which, for the smoker embodiment shown, features temperature sensor that is in contact with the heated air in smoker chamber 201 and in direct line or wireless communication with local information conveyance device in the form of control unit 224 fixed to top panel 218 (e.g. a threaded fastening arrangement or permanent weld or a tool free releasable connection as in a hook and loop patch connection or key-slot arrangement with lock cam, etc.). Local conveyance device 224 is in information communication with remote information conveyance device 226 which, in this embodiment, local device 224 features a wireless transmitter for transference of current smoker chamber temperature data (e.g., digital based communication system) sensed by sensor 222 and forwarded to control unit 224 for transference. Remote information conveyance device 226 features a display device 228 which provides a means for displaying the conveyed smoker chamber temperature information. In a preferred embodiment, local information conveyance device 226 also includes a display device 230 which displays the sensed temperature of sensor 222. Control unit 224 can be limited to just a display temperature function preferably also with the remote activation switch 65e for its transmitter or provided with additional display components such as a signaling device for when the temperature in chamber reaches a preset temperature (e.g. sound unit 65g and/or light display 65h) and/or a Celsius or Farenheit toggle means 65f and/or on/off switch 65i as a few examples of display indicia means.

FIG. 16 illustrates an alternate embodiment of a cooking characteristic information exchange system 232 which is free of a remote information conveyance device but inclusive of a local cooking characteristic information conveyance device 234 with display device 236 and a food item temperature probe assembly 240 with communication link 238 for conveying temperature data to the control unit 234 shown mounted on top panel 218 of a smoker housing. As seen display device 236 displays the probe temperature determined by probe assembly 240 utilizing any one of a variety of standard display screen projection techniques such as LED lights with or without backlighting (e.g., a switch on backlighting for improved night vision). In the FIG. 16 embodiment there is not shown the additional features like that shown in FIG. 15 thus representing a more simplified embodiment; although these features can also be included in the FIG. 16 embodiment. FIG. 16 further reveals projection display device 242 which represents an additional display indicia means options that provides for projection of, for example, the current probe temperature (alone or in conjunction with other sensed cooking characteristics such as a preset food item temperature and/or smoker chamber set and/or current temperature), current time and/or cooking time elapsed etc. which display indicia categories are also potential display types for the remote and control unit based display devices discussed above and below.

FIG. 17 illustrates an additional embodiment of a cooking characteristic information exchange system 244 with both sensor 222 and probe assembly 240 feeding respective information of smoker cooking fluid and food item temperature to local information conveyance device or control unit 246 with display device 248 featuring split screen display sections 250 and 252 which in this embodiment display, respectively, smoker chamber cooking fluid temperature at 250 and probed food item internal temperature at 252. In this embodiment, there is featured only a local information conveyance device, although as illustrated above and below, alternate embodiments feature both local and remote information conveyance devices for both temperature sensing means represented by sensor 222 and probe assembly 240.

FIG. 18 shows an additional cooking characteristic information exchange system 256 that includes remote cooking characteristic information conveyance device 258 that is in a bi-directional information communication relationship with local cooking characteristic information conveyance device 255, as in the wireless bidirectional, digitally based connection illustrated by way of signal direction arrows 260 and 262. In the FIG. 18 embodiment, remote conveyance device 258 includes display device 264 which, for this embodiment, displays the temperature sensed by sensor 222. In addition, with its bi-directional function, there is provided setting adjustment means as in the up/down button set 266 supported by the housing 268 for remote conveyance device 258 that enables a user to alter, for example, a preset smoker chamber cooking temperature in remote fashion and without having to open the smoker door or go over to the smoker housing (a similar temperature adjustment device is preferably provided on control unit 256 or at some other location on the smoker housing or adjacent structure). Upon pressing of an up or down button the display device preferably toggles off the current real time setting to display the last preset temperature value and, if depending on the button pressed, the adjustment temperature. FIG. 18 also illustrates remote conveyance device 258 having a housing 268 with user engagement means 270 which can take on a variety of forms as in a clamping or clipping unit or necklace support, but in a preferred embodiment features a wrist (or other part of the body) securement band that can take on a variety of forms including the hook and loop attachment assembly 272 for attaching band sections 274 and 246 about the wrist. The size of housing 268 can be made in similar fashion to the standard watch size ranges which reduces, however, the ease of display in many instances. Thus remote device 258 can be sized to have an enlarged display 264 (e.g., a length greater than the wrist its supported on) with suitable adjustment in the band sections 274 and 276 as in forming a monolithic strap releasably connected to a pin slot formed in the back of the housing 268 rather than end mounted individual strap sections as shown in the figures. FIG. 18 also shows a projector display 242 similar to that in FIG. 16, which is an optional component that can be dropped in an alternate embodiment that relies on the local and remote display devices only.

Figure 19:
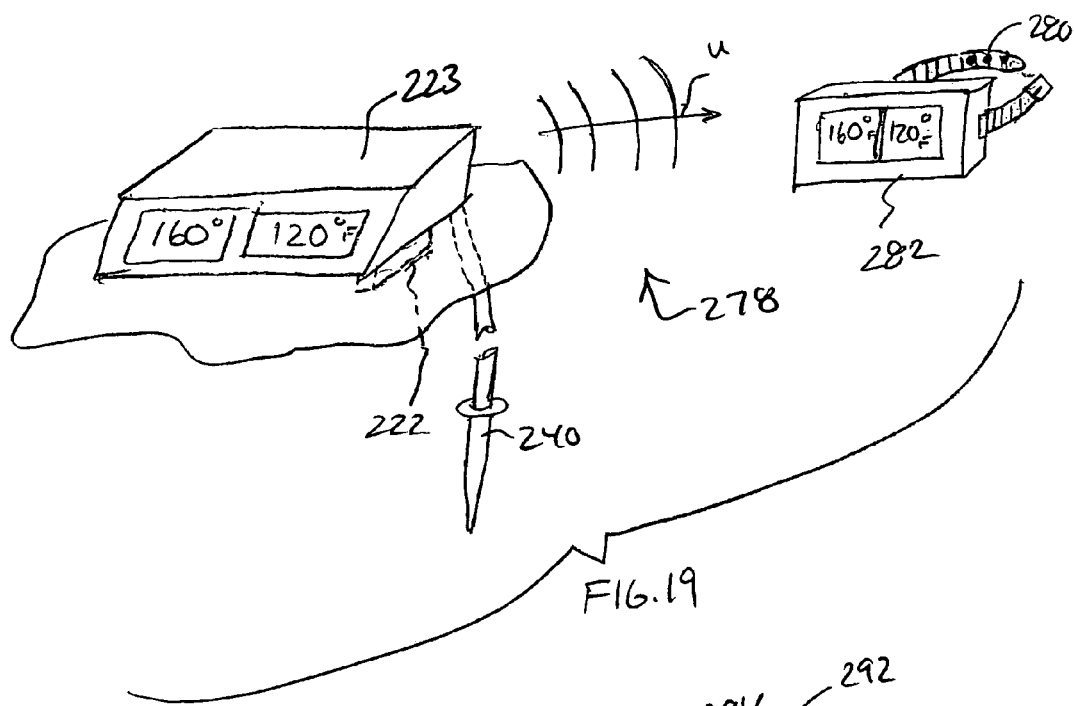
FIG. 19 shows an embodiment of a cooking apparatus information exchange system with local and remote information conveyance devices that each include a smoker chamber and probe temperature display device with unidirectional wireless interaction.

FIG. 19 shows an additional embodiment of a cooking characteristic information exchange system 278 which is a wireless unidirectional embodiment like that in FIG. 15 with remote conveyance device 282 having a wrist strap (wristwatch like attachment in this view) attachment assembly 280 with a split screen display both on the remote and local unit in similar fashion to the embodiment of FIG. 17. As shown, temperature sensor 222 can be directly wired to the local conveyance device or indirectly as through a base mounted electrical control system with control assembly 68 that is hard wired or in wireless communication with the local information conveyance device 223 mounted externally on the smoker 20.

Figure 20:
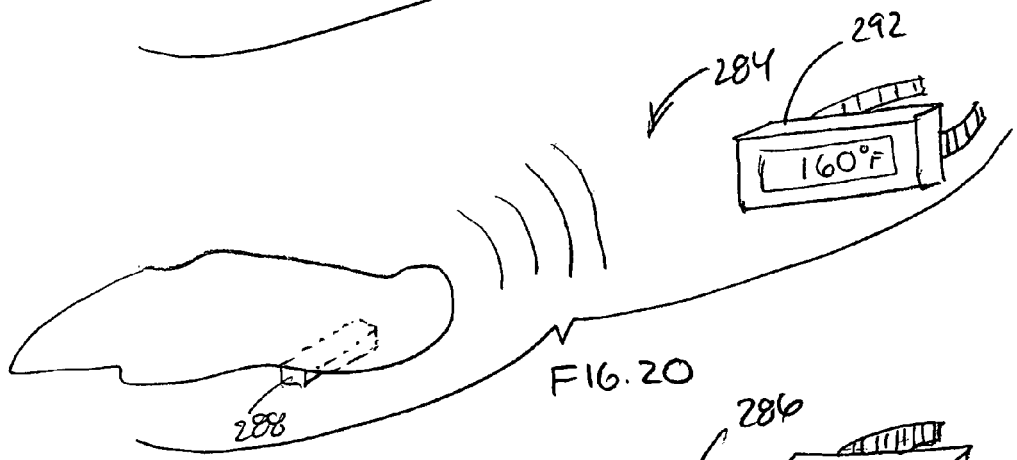
FIG. 20 shows an embodiment of a cooking apparatus information exchange system in the form of an internalized local information conveyance device and a remote information conveyance device that includes a remote smoker chamber temperature display device.
Figure 21:
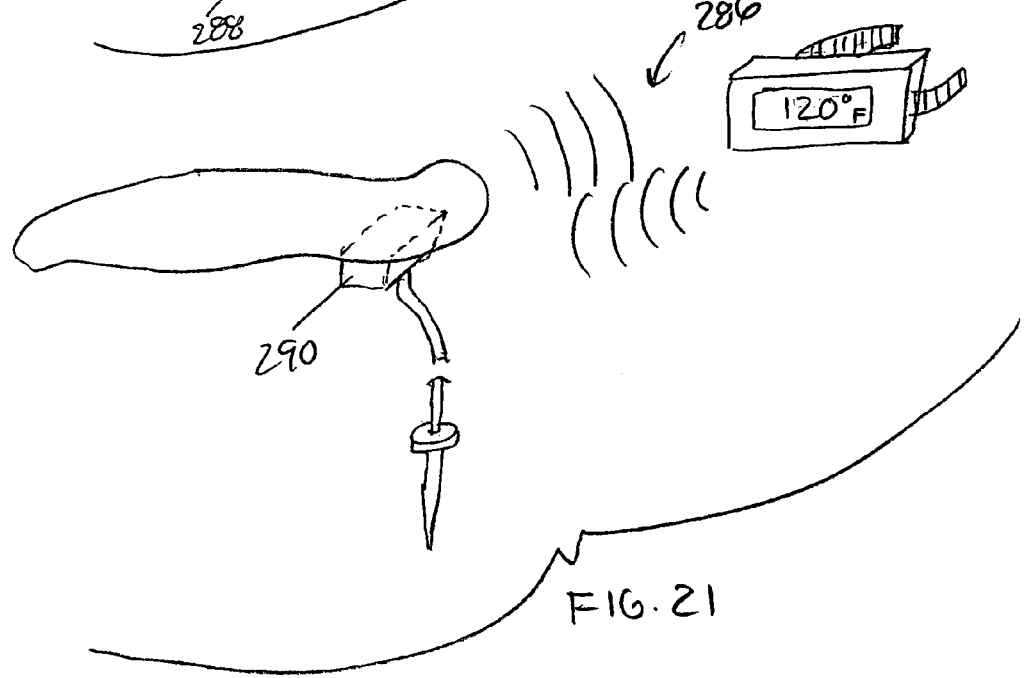
FIG. 21 shows an embodiment of a cooking apparatus information exchange system in the form of an internalized local information conveyance device and a remote information conveyance device that includes a remote probe temperature display device and a wrist clasp.

FIGS. 20 and 21 illustrate alternate embodiments of cooking characteristic information exchange systems 284, 286 featuring local information conveyance devices 288, 290 that are internalized in the cooking apparatus unlike the prior embodiments where the local conveyance device was external to the cooking chamber and are lacking a display at the local site. FIG. 20 illustrates a smoker chamber temperature sensor embodiment with a unidirectional wireless transmission to remote device 292 while FIG. 21 shows a probe based temperature sensing unit with the bidirectional wireless arrangement described above which facilitates providing both a temperature display and a control adjustment means relative to a previously set temperature value.

Figure 22:
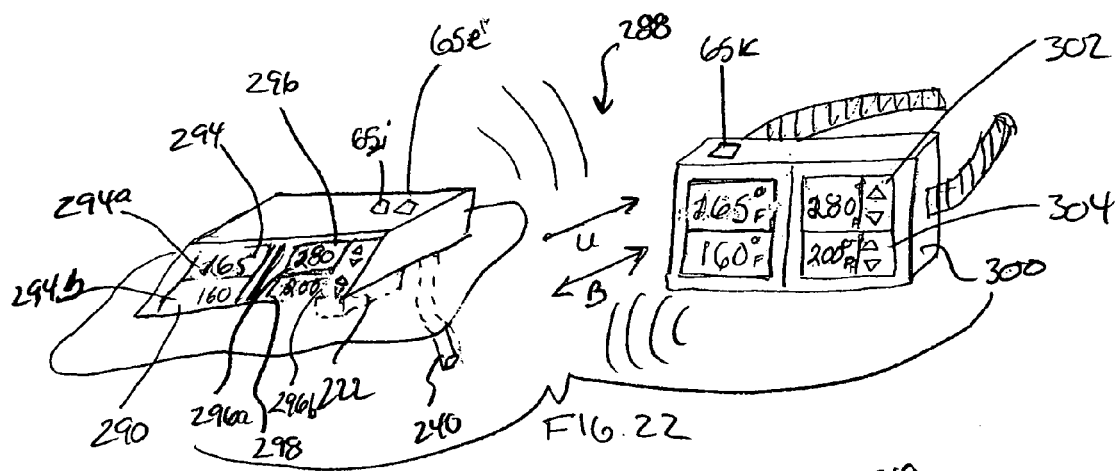
FIG. 22 shows an embodiment of a cooking apparatus information exchange system in the form of a local and a remote information conveyance device with each having a combination smoker chamber and probe temperature display unit and each with bidirectional (transmit/receive) setting adjustment means for probe temperature and smoker chamber (air as cooking fluid) temperature setting adjustment.

FIG. 22 shows an additional embodiment of a cooking characteristic information exchange system 288 for use, for example, with a smoker cooking apparatus having an alternate display device arrangement for both the local display 290 and the remote display 292. As seen, local display 290 features a greater than two sectional display arrangement which in a preferred embodiment comprises a four screen section display with associated sets 294, 296 each having two display sections 294a, 294b and 296a, 296b, respectively, with an associated functional attribute within each set. For example, display sections 294a and 294b as shown in FIG. 22 are preferably set up to show a preset probe food item completion temperature (165° F. shown as an example) and the real time temperature level (160° F. shown as an example) as determined by the probe assembly 240, while set 296a and 296b preferably show preset smoker temperature and real time smoker chamber temperature (280° F. and 200° F. shown as illustrative smoker chamber temperatures). A variety of alternate display patterns are also featured under the present invention, as in keeping the display arrangement shown at the local unit and just showing the real time temperature at the remote unit to lessen display space utilized, etc.

FIG. 22 also shows switch 65e discussed above for turning the wireless function off and on, while switch button 65j is preferably representative of a toggle switch between a bidirectional on function and only a unidirectional wireless arrangement function, a similar unidirectional or bidirectional optional switch is also illustrated by button 65k in FIG. 22. Under the bidirectional mode or at least a unidirectional mode in the direction of remote to local, remote unit 300 is able to adjust the preset temperature levels for the smoker chamber or probed food item done settings via respective up/down button adjustment sets 302, 304.

Figure 23:
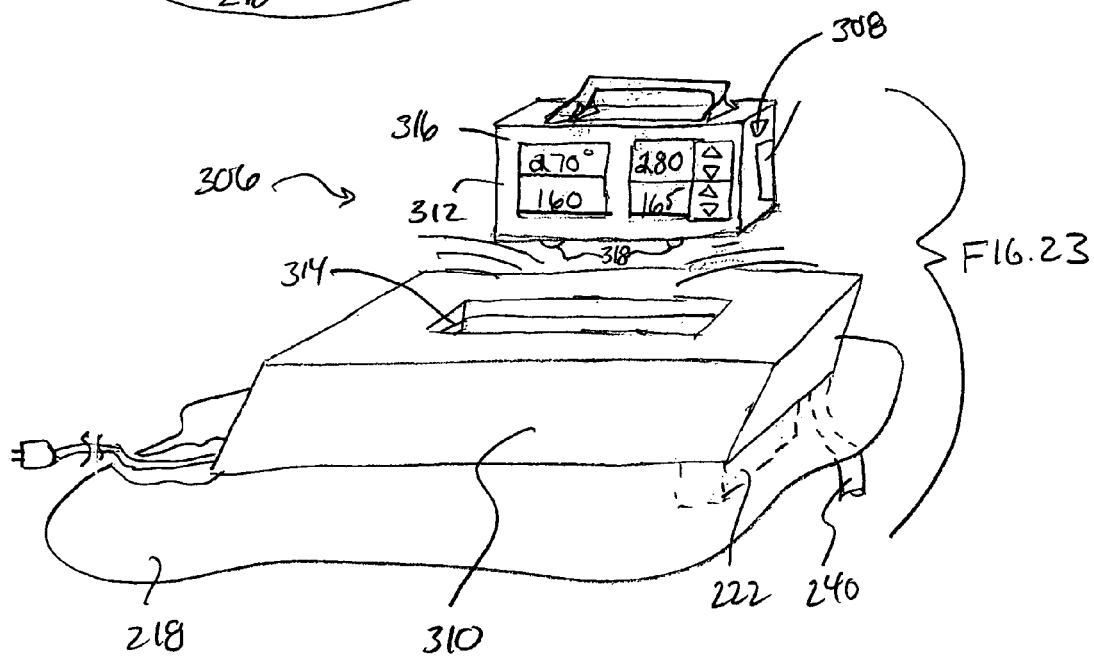
FIG. 23 shows an embodiment of a cooking apparatus with a cooking characteristic information exchange system comprising a dual functioning (e.g., plug in for local and take out for remote) cooking apparatus information conveyance device for a smoker with a combination chamber (cooking fluid) and probe temperature display and setting control device.

FIG. 23 shows an additional embodiment of a cooking characteristic information exchange system 306 featuring a dual remote/local functioning information conveyance device 308 which comprises docking station 310 and portable information conveyance unit 312. In the illustrated embodiment docking station 310 includes a reception recess 314 designed to receive in a preferred friction hold fashion the bottom of housing 316 of information conveyance unit 312 having, in the illustrated embodiment, a four section display arrangement as in FIG. 22 but with side to side common function displays. FIG. 23 further illustrates an electrical plug in cord for providing energy to the docking station while information conveyance unit 312 has a battery pack or other charge storage means (e.g. one similar to a wireless telephone battery pack and docking charge arrangement) which is powered upon being docked via suitable contacts 318. An additional control unit is preferably provided as in the door in the event of a temporary displacement of the dockable information conveyance device.

Again, a variety of variations are possible under the present invention such as utilizing one or more of the various features shown in FIGS. 1, 7 and 15-23 (or any figure herein) in one or more of the various embodiments shown and described.

Figure 8:
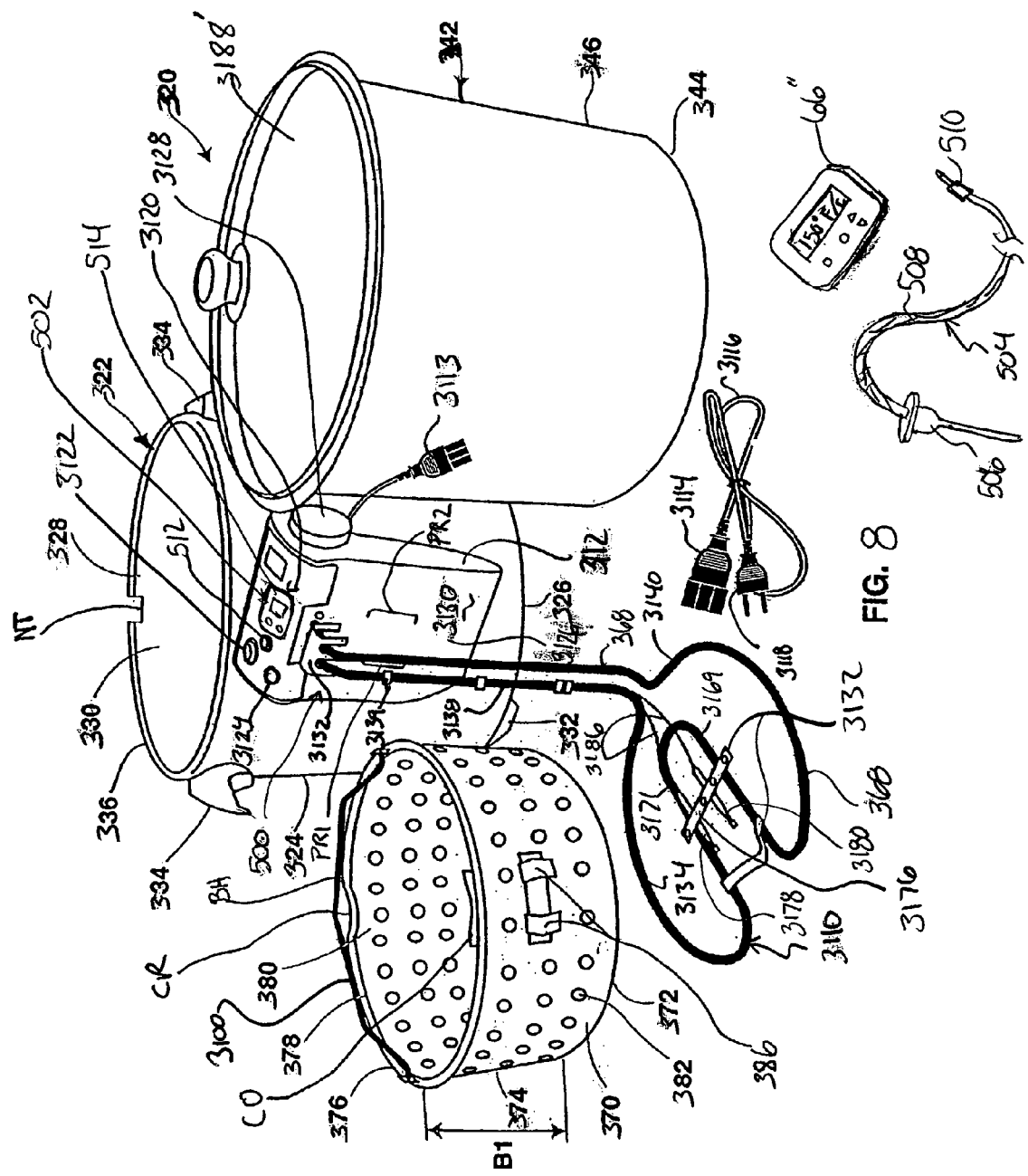
FIG. 8 shows the components for a fryer (e.g., electric turkey fryer) which includes a cooking characteristic information exchange system which includes a temperature probe assembly and local and remote cooking characteristic information conveyance devices.

With reference now to FIGS. 8-14 and 24 an alternate embodiment of the present invention is described. FIG. 8 shows a cooking apparatus 320 in the form of an electric turkey fryer which includes a cooking characteristic information exchange system 500 having similar features like system 200 described for the FIG. 1 embodiment of the present invention.

As shown in FIG. 8, cooking apparatus 320 comprising shell 322 having external wall 324, base 326 and upper opening 328 leading into interior cavity 330. Shell 322 is preferably made of a relatively sturdy material such as steel or a heavy gauge aluminum (or, as described below, of plastic or a combination of materials as in a plastic ring with meal heat shield bottom disk), and can be either a single wall shell or a laminate or a multi-stack wall as in a double walled shell with or without intermediate insulating material (not shown).

As seen from FIG. 8, feet or lift-off means (e.g., individual feet or one or more continuous annular ring members) 332 are fixed to (or integral with) base 326 of the shell and extend downward for contact with the support below such as a table or countertop. Feet 332 help promote air flow across the bottom surface of base 326 and spacing separation in general between the heat source (resistor and heated cooking fluid) and underlying support so as to help avoid overheating damage to the underlying support.

Shell 322 further includes grasping handles 334 shown in the figures to be diametrically oppositely positioned within the upper 15% of the height of shell 322 and below the upper bead or edge 336 of shell 322 having notch NT formed over a small portion (e.g., less than 2 inches [5.08 cm] of the circumference). These grasping handles are useful for carrying the fully assembled cooking apparatus from one location to the next. The height of the shell from the interior surface 338 of the bottom of shell 322 to upper rim or bead edge 336 and the diameter or average width of the shell are sized for the below described accommodation of cooking pot 342 that is, itself, sized for handling large food items such as an 8 to 18 lb [3.62 to 8.16 Kg] turkey T and a corresponding amount of cooking fluid. The shell and pot are dimensioned for maintaining a lower center of gravity upon receipt of the turkey and oil which lowers the pot tipping potential (e.g., the cooking apparatus is designed to accommodate up to 30° of tilt before tipping when in a fully filled state (e.g., with a maximum turkey size in oil at the full level state)). A preferred height range for the shell includes 9 to 20 inches [22.86 to 50.8 cm], more preferably 12 to 15 inches [30.48 to 38.1 cm] with 12.75 inches [32.38 cm] being well suited based on the additional preferred food sizing characteristics set out below (e.g. a maximum 14 pound [6.35 Kg] turkey recommendation). The shell diameter (the interior surface diameter or a maximum width value of the interior surface if other than a circular shell configuration is involved) preferably is in the range of 10 to 20 inches [25.4 to 50.8 cm] or more preferably 12 to 18 inches [30.48 to 45.72 cm] with 15 inches [38.1 cm] being well suited for the present invention. These diameter or peripheral width spacing values are well designed to accommodate a container such as the corresponding cooking pot embodiment described below for cooking large single food item as in a turkey. The preferred volume presented by the interior shell wall (e. g., a preferred cylindrical shape) or walls of the shell is designed for receiving cooking pot 342 which preferably is formed either with a typical cylindrical design as shown in FIG. 8 or of a design that provides a reduced cooking fluid volume, while still being suited to accommodate large food items as in a whole turkey, which turkey, in and of itself, generally occupies a volume that will result in an increase of 35 to 65% in cooking fluid level from a pre-insertion of turkey to a post insertion of turkey (or other large single food item) state. It should be noted that any dimension provided herein is for illustrative purposes and not meant to be limiting relative to the general scope offered by the present invention.

FIG. 8 illustrates cooking pot 342 designed for receipt inside cavity 330 of shell 322 and preferably being of a height that provides for some degree of overhang relative to the upper rim of the shell. In the embodiment illustrated in FIG. 8, cooking pot 342 has bottom 344 (preferably flat on the inner side, but raised or depressed areas on the inner side are also featured under the present invention), side wall 346 (which term is meant to encompass, for example, a single continuous side wall as in a continuous curvature cross-section (circular or oval) or multi-sided configurations as in non-cylindrical configurations and side walls having relative width deviations going in the vertical direction) with interior surface 348 defining upper opening 350 and pot cavity 352 (FIG. 10).

Shell 322 has an upper edge 336 that preferably includes an upper curved or flat support section to provide a contact support region for overlying flange 354 of cooking pot 342. Flange 354 of pot 342 preferably features a first section extending horizontally or more horizontally than vertical and is either planar or curved such as a planar orientation associated with a curved or planar shell upper edge of the shell. In addition, flange 354 (FIG. 13) further preferably includes a radial outer second flange section 356 that extends vertically or more vertical than the first section. The distance between the outer wall surface of the shell's main body, and the interior surface of the flange section is preferably designed for providing a limited radial movement potential relationship while, on the other hand, preferably avoiding a tight or difficult to separate interference fit between flange section 356 and the below supporting shell edge 336 (e.g., a radial clearance of 0 (slight contact all around) to ⅛ inch [0.32 cm] (limited radial adjustment potential)). This flange nesting relationship helps properly align cooking pot 342 within the receiving cavity presented by shell 322 (e.g., establishing an equal radial spacing between the shell and pot at different horizontal cross-sections over the height of the cooking pot as in the upper half to upper quarter of the cooking pot depending on the degree of volume reduction slope in the portions of the cooking pot as described in greater detail below). This relationship also allows for ready separation and removal of the cooking pot as when removing cooled cooking fluid or during cleaning. The radial distance of flange 354 is of, for example, 0.5 to 1.25 inches [1.27 to 3.18 cm] in radial width.

There is also preferably provided a suspension spacing S4 (FIG. 13) of, for example, 0.25 to 1.25 inches [0.64 to 3.18 cm] between the exterior bottom surface of cooking pot 342 and the facing interior bottom surface of shell 322 with a 0.5 inch [1.27 cm] spacing being well suited for purposes of the invention. In addition to being spaced in the vertical direction, the suspended cooking pot also preferably has its outer wall surface spaced from the interior side wall of shell 322 (e.g., spacing W5 (FIG. 14) of, for example 0.25 to 2.0 inches [0.64 to 5.08 cm] with 0.75 inch [1.91 cm] being preferred) which is of equal value for more then a majority of the cooking pot height, but as seen can vary for the cooking fluid volume reduction embodiments and also at the bottom region where cooking pot 342 preferably includes step-in means 358. In those cases W5 represent an averaged value over the height of the cooking pot.

In an alternate embodiment, (not shown) there is a direct and/or non-concentric contact bottom relationship and/or a direct and/or non-concentric contact side wall relationship. From the standpoint of, for instance, improved exterior insulation, the concentric side and bottom suspension spacing arrangements are preferred.

A preferred embodiment of the invention has a cooking pot 342 that includes a preferably integrated step-in means 358 (FIG. 14) providing for basket or food cooking item support and/or cooking fluid volume reduction means. The step-in means preferably includes a plurality of circumferentially spaced radially inwardly extending steps, or, alternatively, a continuous step-in structure is also featured. Thus, step-in means 358 preferably has an "indented" region extending radially in form a location coincident with the bottom of the pot and the stepin region can take on a variety of forms.

In addition to the preferred shell feet and cooking pot suspension (upper flange/bead overlap), there is also preferably provided by way of step support 358 in the cooking pot, a suspension spacing S1 (FIG. 13) between the below described basket or food support means 370 and the interior, bottom surface 348 of the cooking pot. Spacing S1 is designed to avoid direct contact between the below described basket or alternate food support means (e.g., a through or into turkey skewer with bottom platform or spoke arrangement that is sized for contact along suspension means 358) and heating element 368 and/or to provide for cooking fluid circulation between the direct support food holder and the cooking pot surface 348. When considering the relatively high weights involved in food items such as a turkey, the upper flange 354 of cooking pot with flange and bead 336 of shell are designed to be of sufficient strength to support the cooking fluid and food item(s) and food support means as in a basket received within the pot (with step support 358 providing backup or additional support in the embodiment shown).

Food support means 370 is shown in FIG. 8 as a basket. As shown in FIG. 8, basket 370 comprises bottom 372, side wall 374 and upper edge 376 defining food reception opening 378 leading to food reception cavity 380. Side wall 374 is preferably provided throughout with side wall apertures 382 (with 3 to 6 vertically spaced circumferentially extending rows of apertures preferred). As the illustrated basket is designed to provide for deep frying heavy objects such as a turkey (including the added weight associated with post cooking absorption of cooking oil) it is preferably formed of unitary metal structure with apertures formed therein and preferably not of low load wire or metal rod screen or mesh arrangements such as in conventional indoor deep fat fryers, although with suitable strength wires the use of mesh is possible under the present invention or for fryers for use with lighter loads, a mesh screen provides an alternate food item support means. When dealing with a turkey fryer, because of the heavy load possibility the basket is formed of relatively thick aluminum (e.g., at least 1.0 mm thick) material. To maintain sufficient strength there is a greater percentage of solid surface than open surface in the areas where apertures are provided. For example, 0.3 to 0.7 inch [0.8 to 1.8 cm] diameter holes with 0.7 to 1.5 inch [1.8 to 3.8 cm] minimum spacing between holes. A series of 0.5 inch [1.3 cm] holes with 0.9 inch [2.3 cm] minimum spacing covering all surfaces of the basket provides a good high strength/drain-steam arrangement. In this regard reference is made to U.S. Pat. No. 6,711,992 which patent is incorporated herein by reference.

The basket has a side wall that is of sufficient height to adequately retain a large turkey in position (preferably vertical orientation) within the basket despite the turbulent effects of deep fat frying. For example, a height ratio range of 2:8 to 5:8 relative to the cooking pot. A basket height as indicated is also well suited for steaming typical quantities of seafood such as clams and mussels. A basket height (main body) of about 7 to 10 inches [17.78 to 25.4 cm] is illustrative. Bottom apertures are additionally preferably provided and are preferably sized and circumferentially serially spaced similar to those in the side wall.

Figure 14:
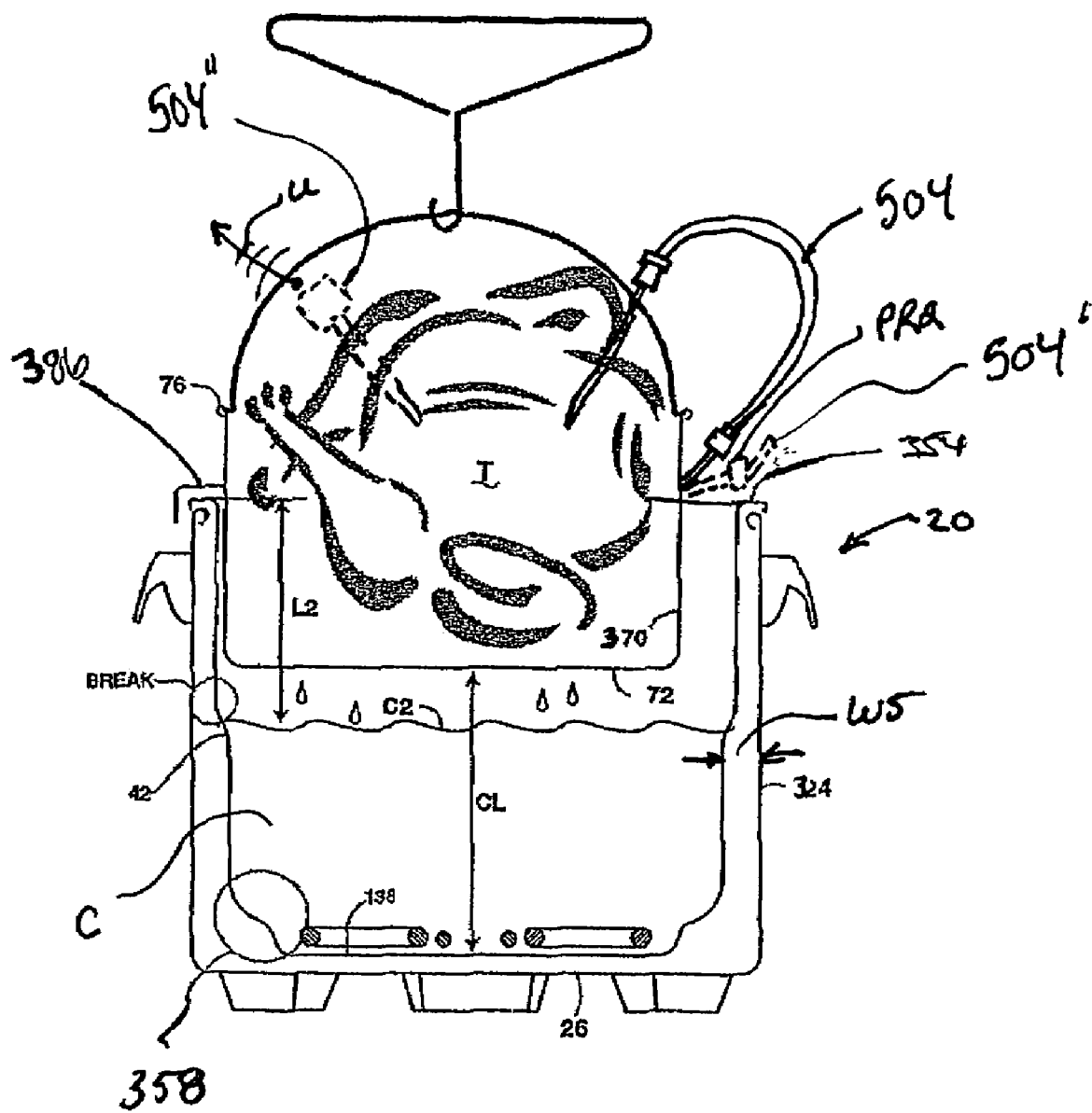
FIG. 14 shows a view similar to FIG. 13 but with the turkey/basket combination being withdrawn from the cooking pot (or being inserted) with the probe inserted into the food item (a wireless transmitting probe being shown as an alternate embodiment in dash lines)

In a preferred embodiment, the height of basket 370 is at least 25% of the total height of cooking pot 342 and more preferably falls with a range of ⅜ to ⅞ of the cooking pot. As shown in FIG. 14, capture device 386 (e.g., a capture hook formed with two circumferentially spaced hook prongs) is positioned heightwise on the basket to provide some drainage clearance when the pot and basket are lifted out of contact with the cooking fluid which during cooking covers over the turkey. As seen from FIG. 14, the dripping fluid returns close (some absorption involved) to a turkey pre-insertion height level (e.g., a volume of about 10 liters of cooking fluid suitable for a turkey of about 12 to 14 pounds in weight).

Figure 13:
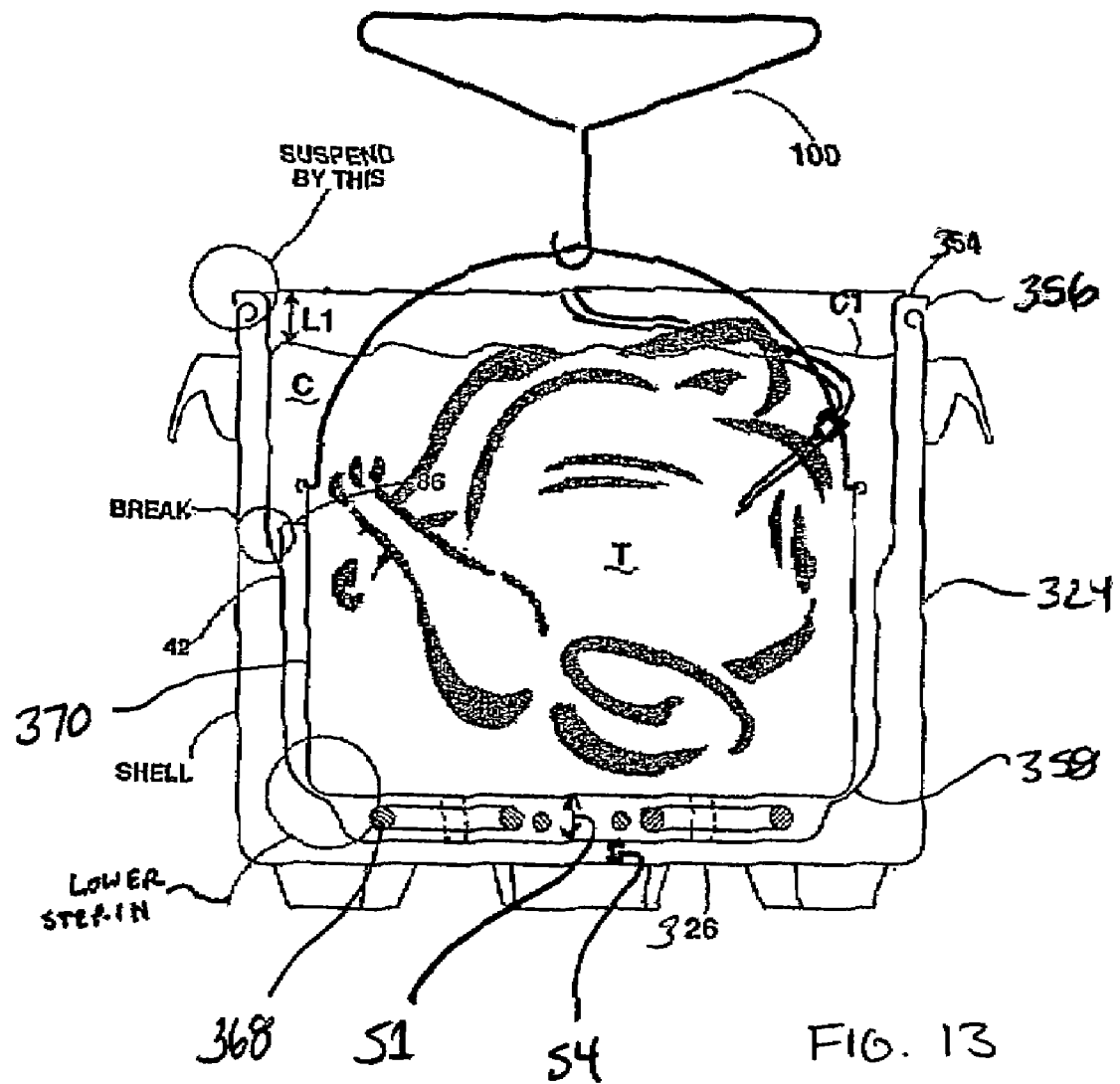
FIG. 13 illustrates an electric fryer with a food item (e.g., turkey) positioned within the cooking fluid just prior to being removed (or just past being inserted) with the grasping handle engaged with the cooking basket and with the probe inserted.

When the capture hook 386 is positioned on the upper flange or bead edge 354 of cooking pot 342 it is placed into drainage mode with the under surface of basket 370 spaced sufficiently off the remaining cooking fluid surface level as to provide for drainage of cooking fluid from the suspended basket (a post cooking submerged arrangement is also possible, particularly with a pot having drainage means as in the drain spigot featured in U.S. 2005/0034611 to John McLemore, which is incorporated herein by reference, although as the cooking fluid cool down period is often longer than the food drain and cool sate, the former arrangement is preferred). FIG. 13 illustrates a cooking mode with turkey T submerged under upper surface level C1 of cooking fluid C and level C1 being a distance below the upper contact surface 354 of the cooking pot in a cooking mode state with the upper end of turkey T submerged or sufficiently close to level C1 to provide sufficient cooking heat temperature. Suitable values for L2 include 3 to 6 inches [7.6 to 15.2 cm] with 3.75 inches [9.5 cm] being well suited under the present invention or 20 to 50% of the overall height of pot 342 with 25% being a suitable percentage. Distance L2, represents the height from the upper edge of cooking pot 342 to level C2 of the cooking fluid when the basket and turkey are suspended above C2. C2 is preferably 5 to 10 inches [12.7 to 25.4 cm] with 6.75 inches [17.1 cm] being well suited for uses of the present invention, and with 45 to 65% of the overall height being highly preferred and with 55% being preferred.

The clearance space between the bottom of suspended basket 370 and the bottom surface 348 of cooking pot 342 is shown in FIG. 14 as clearance distance CL and is controlled by the relative position of the noted capture device which is (the contact portion) preferably about 0 (essentially at) to 4 inches [10.16 cm] from upper edge 376 of basket 370 or more preferably 1 to 3 inches [2.54 to 7.62 cm] down from upper edge 376 or within an intermediate range of 0 to 45% of the full height of basket 370 with 0 representing the upper edge.

An additional feature of basket 370 includes clearance recess or groove CR (FIG. 8) which runs vertically along the side wall of basket 370 between the basket's upper edge and a lower end of the basket (preferably defined by a rectangular cut out CO as shown in FIG. 8 which facilitates the concave protrusion's radially inward extension and preferably extends to the bottom of the basket). As explained in greater detail below, clearance recess CR is dimensioned to avoid direct contact between the basket and a vertical component of heating element 368 when the basket is properly oriented such that the recess CR is aligned with the heater portion 3138 which is also at a location aligned with notch NT in shell 322. Recess CR is also preferably circumferentially spaced by 90° from the contact ends of bailing handle BH with basket 370, and 180° from the capture hook. Recess CR is designed to accommodate the vertical section of the heater bar in a manner which preferably avoids direct contact but avoids wastage of basket volume. Thus, a less than 10° and more preferably about 5° circumferential range is occupied by recess CR with a preferred, generally convex cross-sectional configuration with a 1% to 10% of basket radius radial inward indent.

With reference to FIGS. 8 and 9 there is illustrated heater device 3110 comprising heating element or heater means 368 and control unit 3112. Control unit 3112 is shown to include electric cord receptor 3113 which receives connector 3114 of electric cord 3116 which has on its opposite end standard wall plug 3118 (FIG. 8). Control unit 3112 includes temperature information supply means 3120 (e.g., an electrical LED display or mechanical printed indicia background with dial, spotter etc.), designed in conjunction with the desired temperature range to be utilized in the fryer such as a range of 0 to 400° F. or 0 to 450° F. which ranges are well suited for turkey frying and well below a flash point temperature of cooking oils to be used (e.g., peanut oil). Control unit 3112 further comprises on/off switch (e.g., pressure button) 3122 which has an integrated light such that when the button is placed on the light shines below the button. There is also preferably provided light 3124 which turns off (from an initial on state when the on button is pressed) when a set temperature level is reached or some other signal means (e.g., flashing light to continuous light and/or audible sound) which activates when the set temperature level is reached or re-reached after food insertion. Cooking fluid temperature setting means 3128 is supported on main housing 3126 of control unit 3112 and is preferably in the form of a turn dial 3128 or an electric temperature setting device such as direction arrow press buttons and/or number touch buttons. Although not shown, the interior of main housing 3126 supports the electrical connections involved in supplying power from cord 3116 to the heater element of the heating unit at the desired level to conform to the temperature set by temperature setting means 3128 as well as the safety controlling means described below.

Main housing 3126 has radial interior surface 3130 which is elongated and arranged essentially vertically, or with a common slope as the supporting outer shell. The interior surface 3130 has means for engagement with shell 322 to help provide a stable relationship. In one embodiment that connection device is comprised of a pair of male projections PR1 and PR2 as in T-shaped or oppositely outward arranged C-shaped cross section projections. These projections extend outward toward the shell and are arranged for sliding connection in female reception grooves formed in block BL connected to the outer side of shell 322 as shown in FIG. 10. The reception grooves in block BL have an open top and a blocked off bottom to assist in proper height positioning. A wider open top end and diverging upper section into vertical slots is preferred. Reverse female and male connection arrangements are also featured under the present invention, or alternate connection means as in magnetic fasteners or some alternate fastening means (quick release hand cams or hand release screws). An electrical contact shut down system is preferred which breaks the electrical circuit when the male/female connection in the control unit is disengaged.

Heater device 3110 is shown to include main body mount (e.g., a mounting bracket) 3132 securely fixed to housing 3126 and supporting resistance element 3134 of heating element 368, which in a preferred embodiment is a resistance heater bar which has two prong ends for electrical connection in the control unit's housing. Resistance element 3134 is shown to include upper section 3136 in a direct supporting relationship with mount 3132 and is shaped to extend over and to opposite sides of upper edge or flange 354 of pot 342, preferably in horizontal fashion in its extension out from mounting bracket 3132 and within a recessed region in pot 342. The illustrated bridging or mount bracket 3132 is shown securing heating element 360 in a preferred generally concentric spacing relative to the interior side wall of the pot (i.e., preferably both a side wall spacing and a suspension arrangement relative to the bottom surface of the pot), and also has an upper surface which is generally commensurate or flush with the upper flanged edge of the pot such that a see-through top or lid 3188 has its outer edge in a heat sealing flush relationship. Also, notch NT (FIG. 8) of shell 322 (and preferably an associated tab region in the cooking pot) provides a clearance location for the passage of the two prongs of the shaped resistance bar extending over the upper edge of notch NT into its reception area of main housing 3126 in connection with a reception region or recessed area in the cooking pot. Also, when combining cooking pot 342 and shell 322 together, there can be provided a tab that is formed as an indented upper edge region in the cooking pot which can also double as a pour out region or the tab means can include one that is provided by way of a pair of circumferentially spaced cuts (one shown) in the pots flange and a bending down to, for example, 45', and a bending of any radially outward overextending portion or a male projection off the cooking pot released in a notched region of the shell or vice versa. This tab means arrangement helps in locking the two components together and helps in covering over a gap formed in between the shell and cooking pot. In an alternate embodiment shown in FIG. 12, the notch recess receives a connection block liner BR1 which is designed for a male/female connection with a corresponding connection block BR2 (e.g., each insulating blocks) provided by the cooking pot as in a downwardly extending block member sections (spaced apart to accommodate the upper, horizontal components of the resistance heater bar). As shown, this tab means in the cooking pot and the corresponding reception means in the shell provide for electrical line or resistance passage in an internal to external manner.

As noted, the tab member can also be formed in a non-cut arrangement by providing a depressed region in the flange of the pot that generally conforms in configuration to the shell notch for a locking relationship. This indentation can be formed in conjunction with the volume reduction step means in the cooking pot.

Intermediate section 3138 of heater resistance element 3134 extends for essentially the full length of the interior surface of cooking pot 342 but for a bottom of pot clearance spacing of, for example, a spacing of 0.125 to 0.750 inch [0.32 to 1.90 cm] above the interior bottom surface of pot 342, which is suitable to avoid direct pot contact and provide some degree of cooking oil circulation under the heating element bottom section 3140 (e.g., an intermediate position between the bottom of basket 370 and bottom interior surface of cooking pot 342). With notch NT and the cooking pot depression defined by a tab means, there is accommodated heater element thickness spacing below the cooking pot's upper edge and the relatively thin connection bracket 3132, the overall vertical length of section 3138 is essentially equal to the height of pot 342 but for the clearance spacing between the lower edge of the bottom heater section 3140 and the bottom of the cooking pot. Heater resistance element 3134 further has its bottom section 3140 designed to extend in parallel fashion above the interior bottom 348 of pot 342.

Connection bracket 3132 is preferably U-shaped and is sufficiently sized as to bridge the notch NT in shell 322 and can either be curved along its long length to correspond with the circumferential curvature of the shell or not curved since the notch is relatively small 2.0 inches [5.08 cm] or less in circumference or length. Mounting bracket 3132 features a fastener reception hole for receiving fastener (e.g., a screw designed to connect with an underlying component of the assembly or a clamp combination with underside of an adjacent shell flange).

Sensor frame support 3176 extends between and is connected at opposite ends to respective inward extensions 3169, 3171 and hold first and second sensors 3178, 3180 which are preferably thermistor temperature sensors with different temperature control settings and are in communication with control unit 3112 via sensor communication lines 3182, 3184 that is preferably banded to one the other of the vertical heater sections (3154, 3156) so as to avoid dangling and potential catching.

Temperate sensors 3178, 3180 are preferably designed for different functions with one of the two (e. g., sensor 3178) sensing temperature and in communication with a control unit sub-system (not shown) that is also in communication with the temperature setting means 3128 and current temperature display means 3120 such that the sensor 3178 senses current cooking fluid (e.g., water or oil) temperature at the bottom of the pot and control unit 3112 determines whether additional electric current needs to be supplied to raise the oil temperature or whether a lowering or discontinuation of current supply is warranted to avoid overheating relative to the set temperature. In addition control unit 3112 sends a signal to display means 3120 to display the current sensed temperature within a preferred display ranges of for example 0 to 400° F.

The second of the two sensors is preferably a fail safe sensor which shuts down all power if a high temperature is sensed (e.g., 450° F. or 475° F.) This failsafe features is well below the ignition temperature of cooking fluids such as peanut oil (e.g., below 600° F.).

Thus, in use, the cooking pot 342 is inserted into shell 322 followed by the attachment of heating means 368 such that bottom heater element section 3140 is suspended above the bottom of the cooking pot 342, and control unit 3112 is properly and stably supported by the combined cooking pot and shell flanges/upper bead combination preferably in conjunction with the notch NT and cooking pot recess as well as projections PR1 and PR2 noted above. There is then placed up to, for example, a 14 lb turkey in basket 370 as shown in FIGS. 13 and 14.

Suitable cooking fluid as in cooking oil for a turkey or water for shellfish is supported up to the cooking pot fill line (e.g., 10 quart [9.46 liter] amount). The control unit's temperature setting means 3128 is then adjusted to a desired temperature level (e.g., 350° F. [176.7° C.] which is a setting suitable for cooking a whole turkey). For cooking a 14 lb [6.35 Kg] turkey, the following time formula is preferably used (3 min.×num of lbs of turkey) +5 min. (thus, for a 14 lb [6.35 Kg] turkey, (3×14)+5=47/min). The turkey is placed within cooking basket 370 and the basket and turkey are slowly placed in the cooking fluid with the assistance of handle 3100 after the cooking fluid is displayed as having reached the set level (preferably by way of sensed temperature amount display at 3120 and the turning on of a signal as in a light (DS) off and/or audible signal). The cover 3188 is then placed on and the cooking time monitored. Pre-insertion while the cooking fluid is cool is also possible under the present invention with an appropriate extension of time under the above formula. The control unit of the heating device 3110 can also be used in conjunction with a temperature probe that is inserted into the cooking item to monitor internal food temperature as in a plug in reception integrated with a corded temperature probe which when a desired (e.g., preset temperature is reached) triggers a user signal (visual and/or audible) and/or initiates a shut down. An additional internal heat temperature set dial can be also, provided. In a preferred embodiment, the corded probe is passed through the cooking pot tab region together with the upper resistance element sections to allow for flush lid contact.

Once the desired cooking time is reached, the cooker is turned off (e.g., unplugged) (either automatically by the control unit or manually) and the cover removed and then the basket (or alternate food supporting means) is removed with the assistance of grasping handle 3100. The basket is lifted sufficiently high enough for catching a grasping hook on the side of the combination cooking pot and shell flange/upper rim for drain off. Following a period of food oil drainage from the food product and cooling, the turkey is then removed to a suitable food preparation area.

After sufficient cooking fluid cooling off (e.g., 2 hrs for water, 5 hours for oil cooking fluid) the cooking fluid can be properly dispensed either by pouring out or through use of a drain spigot assembly (e.g., into an oil receptacle). The earlier exposed heating means 368 sensor casings and control unit housing are then preferably cleaned with a damp cloth or sponge using a mild soap. The remainder of the non-electrical components being dishwasher safe following disassembly.

A preferred embodiment of cooking apparatus 320 includes one that has a cooking characteristics information exchange system 500 having a local (at least when in cooking ready mode) cooking characteristic information conveyance device 502 (preferably forming part of control unit 3112 such as one that is also an integrated component of the mountable heater device 3110). FIG. 8 shows a first embodiment having both local conveyance device 502 and a remote cooking characteristic information conveyance device 66" and a probe assembly 504 which components are set up in similar fashion to the various probe assembly and local/remote conveying devices described above for the previous embodiments relative to the smoker apparatus. For example, local conveyance device 502 is combined with probe assembly 504 in a preferred embodiment to provide real time food item temperature monitoring via probe assembly 504. Probe assembly 504 is shown in FIG. 8 as including needle probe 506 at one end of communication line 508 and insert plug 510 at an opposite end. Insert plug is designed for insertion into plug reception port 512 formed in local information conveyance device 502 having probe temperature related display device or local display device 514. Display device 514 can either be a stand alone display screen for the probe related information or can be combined in the same display being used to display the cooking fluid temperature monitoring information being fed along line 3186 as described above.

Figure 12:
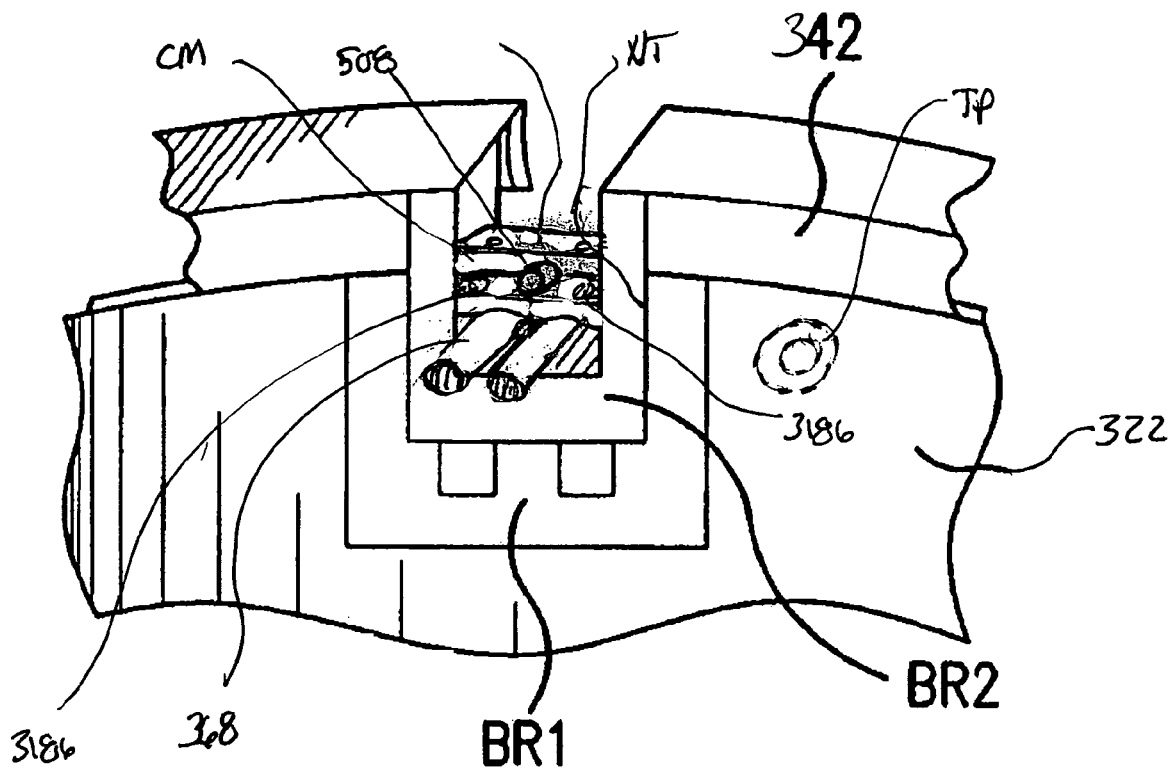
FIG. 12 illustrates the passage of the probe assembly communication cable through a notched region in the cooking pot and shell (a preferred flush cover contact bridge bracket being removed for additional viewing) as well as an alternate option of a reception hole formed to coincide in the cooking pot and the outer shell for probe wire insertion (aligned via the nested tab/notch arrangement)

In addition, exchange system 500 preferably also comprises remote information conveyance device 66" which is preferably in wireless communication with the control unit 3112 as in a bidirectional or unidirectional wireless connection with local information conveying device 502. FIG. 10 shows probe assembly 504 with its communication line 508 plugged in at control unit 3112 at port 512. As seen, line 508 is preferably made to extend through notch NT and the corresponding recessed region in cooking pot 342 so as not to interrupt a flush seal. In this regard reference is made to FIG. 12 showing one embodiment for having connection line 508 extend below bridge 3142 (FIG. 10).

FIG. 9 shows FIG. 8 in an assembled state with cooking characteristic information exchange system having probe assembly 508 operationally inserted with insert plug 510 plugged into the electrical circuitry which provides for operation of local information conveyance device 502 operation to display probed food items. Temperature probe assembly cable 508 can be seen in FIG. 8 as extending through the shell notch and tab means of the cooking pot and then the flexible line 508 is received into plug 512. FIG. 14 shows a second probe assembly 504' that can either be connected at a different input location to local device 502 or provided in a common cable line with 508 in probe assembly 504 (e.g., a wrapped multi-wire cable assembly, extending through the notch). Multiple probes are preferably featured when a plurality of food items are being cooked as in a set of Cornish hens or steaks on a common support rack.

FIG. 14 also shows an alternate probe means embodiment 504" featuring a wireless food item temperature probe for transference to local and/or remote information conveyance device.

In addition, although not shown, the food item temperature probe 504 also preferably has common position clipping means 3139 (FIG. 8) that are used to retain in position lines 3186 leading to cooking fluid sensors 3178, 3180 (at least an upper one to provide for flexibility in manipulating for probe needle insertion into the food item). In addition, rather than reliance on probe plug part 512, the probe assembly 504 can be made either permanently wired to control unit 3112 or, more preferably, to provide user use/non-use flexibility, the above noted plug in arrangement is provided or a detachable probe assembly 504' like that shown in FIGS. 11 and 11a is provided. Probe assembly 504' is shown to have its line 508' in FIG. 11 to be permanently affixed at one end by way of a standard flexible or swivel connection with the housing of the control unit with intermediate connector assembly 509. As shown in FIG. 11a connector assembly preferably includes releasable male/female connector components which provide for detachment of the probe when desired. The length extending between connector assembly 509 and the fixation post is preferably the shorter length of line 508' so that during non-use the shorter probe line section can be releasably attached to a suitable recess or clip member of the control unit housing (not shown) and not dangle at the exterior of the shell to a significant extent.

The probe assembly 504' of FIG. 11a, with its permanent connection with control unit 3112 and detachable intermediate connection assembly 509 also provides means for removal of the cooking basket 370 with temperature probe still attached away from the heating unit until the food item and probe cool down to some extent making probe removal easier.

FIG. 12 shows an alternate arrangement for clamping in position the probe line 508 within the notch/tab means nesting arrangement for the cooking pot/shell combination. As seen a preferably insulating clamp member CM is used to retain in position probe line 508 (as well as heat resistance bars of heater 368) and lines 3186 from the cooking fluid sensors. FIG. 12 also shows a through hole TP as an optional means of providing for passage of probe line from the interior of the pot (and preferably shell as well) to the exterior with a preferred minimization of heat loss to the overall cooking apparatus 320.

Figure 24:
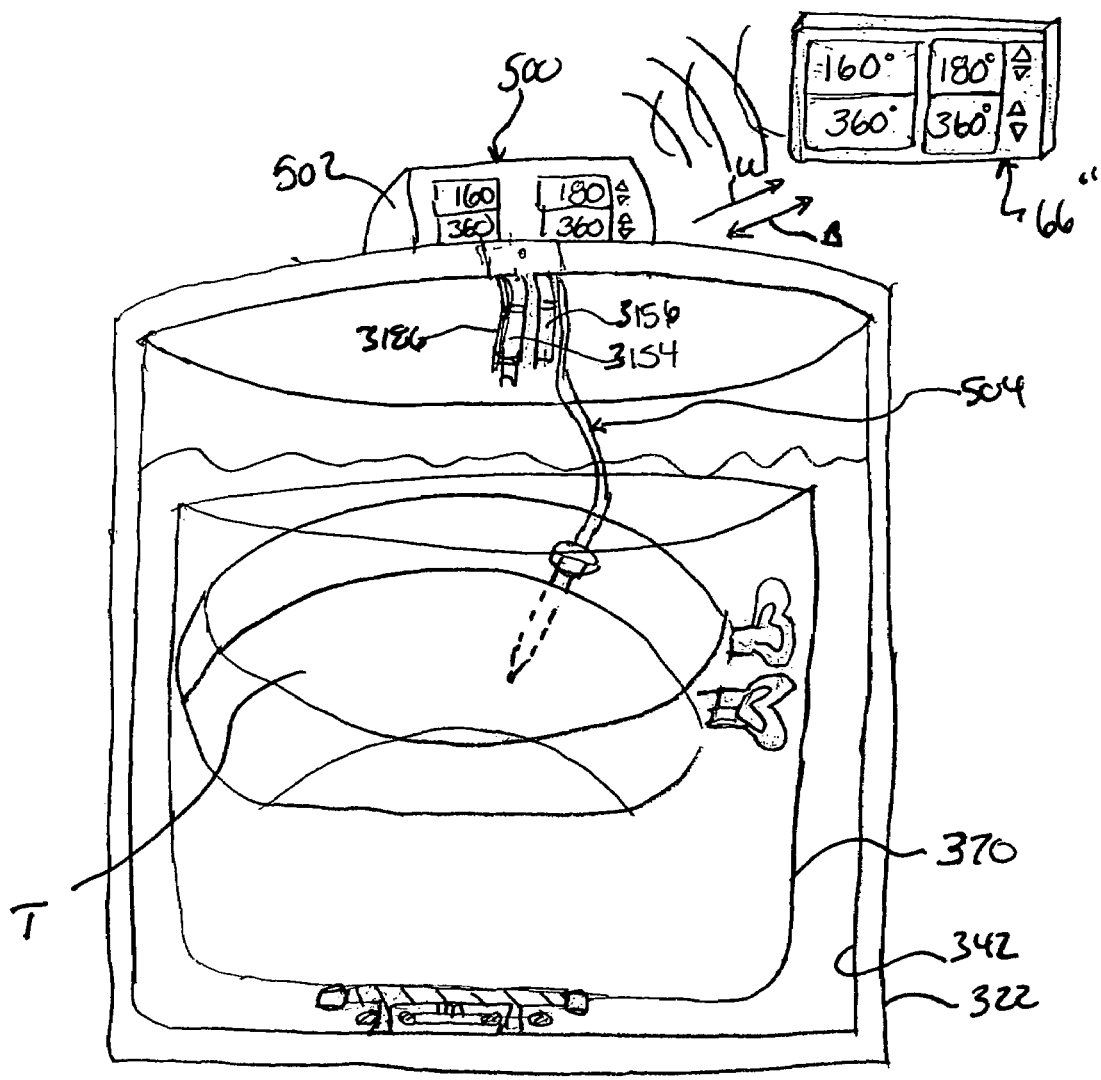
FIG. 24 shows an electric fryer with an embodiment of a cooking apparatus information exchange device featuring a local and a remote cooking apparatus information conveyance device with each having a combination chamber and probe temperature display and setting control device for displaying and adjusting settings in the cooking fluid (e.g., oil or water) temperature and in the food item probe temperature assembly, which, in use, is at least partially submerged in the cooking fluid.

The information exchange between the probe assembly and/or local information conveyance device and/or remote conveyance device can take on a variety of forms such as those outlined above for the smoker embodiment. FIG. 24 shows one example of a cooking characteristic exchange system.

For example, there is preferably featured cooking characteristic information conveyance means comprising both a local information conveyance device 504 and a remote conveyance device 66" that preferably a digital system with bi-directional wireless communication between the remote and local conveyance devices with multiple display means and a cable line connected probe assembly such as that described above for the FIG. 22 smoker embodiment (a high functioning cooking characteristic information conveyance exchange system).

Thus, in a method of using information exchange system 500, probe assembly 504 is inserted into the turkey which is received within cooking pot 370, the basket with turkey with probe is then inserted into the cooking pot preferably when the cooking fluid is at a desired precise temperature (which can be seen on either the local information conveyance device and/or the remote information conveyance device as in the preset and actual numbers displayed coincide preferably with an additional audible or visual (e.g., light) indication of the same). Once inserted the temperature read out from probe assembly 504 is read out on the local and/or remote information conveyance devices 502 and 66". When the actual probe temperature reaches the preset desired probe temperature level for that food item a similar audio and/or visual warning can be initiated and the local and/or remote display devices also preferably display the coinciding temperatures or some other form of indicia to show to the user the probe temperature has reached the desired setting. Also, the remote/local conveyance devices are also preferably in control communication (e.g., bi-directional) that enables remote and/or local present temperature setting adjustments in the foot item probe and/or cooking fluid temperature (heater resistance bar adjustment to meet preset cooking temperature).

It should be emphasized that the above-described embodiments of the present invention, particularly, any "preferred" embodiments, are merely possible examples of various possible implementations embodying the principles of the invention. In other words, many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A smoker apparatus, comprising:
   a heater
   a food item container that comprises a smoker chamber structure that, in use, receives a food item to be heated by said heater, and wherein said smoker chamber includes an internal smoker material reception device and a chamber wall, with said chamber wall having a smoker material access port provided therein with a removable access port cover member, and which access port is positioned relative to said smoker material reception device as to provide for a gravity feed of smoker material from the access port to said smoker material reception device, and wherein said heater is provided in said smoker chamber and is positioned as to heat smoking material placed in said smoker material reception device;

a cooking characteristic monitoring system which includes, a local cooking characteristic information conveyance device which is visibly mounted externally on said food item container and which includes a control unit with a smoker chamber temperature setting adjustment device and an adjusted temperature display device; and wherein said control unit is supported by said smoker chamber as to be positioned externally to a heated cavity heated by said heater within said smoker chamber structure; a temperature probe assembly having a first food item probe, and wherein said local cooking characteristic information conveyance device comprises a probe temperature goal setting adjustment device which provides for adjustments in a predetermined value for food item cooking completion and a probe temperature display device.

2. The apparatus of claim 1 further comprising means for signaling when the probe temperature reaches said predetermined value.

3. The apparatus of claim 1 further comprising a remote cooking characteristic information conveyance device which is remote to said food item container and is in remote data communication with said local cooking characteristic information conveyance device and which has a second probe temperature display device, and wherein said remote cooking characteristic information conveyance device includes a receiver that receives data corresponding to that of said local cooking characteristics information conveyance device as to food item probe temperature determined by said temperature probe assembly.

4. The apparatus of claim 3 wherein said receiver includes means for receiving cooking fluid temperature data and a cooking fluid temperature data display unit.

5. The apparatus of claim 4 wherein said means for receiving cooking fluid temperature data receives internal air temperature of the food item container.

6. The apparatus of claim 3 wherein said remote cooking characteristic information conveyance device includes a receiver for receiving probe temperature data and a transmitter for adjustment of a cooking characteristic setting.

7. The apparatus of claim 6 wherein said transmitter transmits a temperature adjustment command to effect an adjustment in a desired probed food item temperature setting of said probe assembly.

8. The apparatus of claim 7 wherein said cooking characteristic monitoring system conveys a signal when an actual food item temperature level reaches the desired probed food item temperature setting.

9. The apparatus of claim 6 wherein said transmitter provides a temperature adjustment command which effects a cooking fluid temperature adjustment in the cooking apparatus.

10. The apparatus of claim 9 wherein said cooking fluid adjustment command issued by said transmitter effects an adjustment in said heater that alters air temperature in said smoker chamber.

11. The apparatus of claim 3 wherein said remote cooking characteristic information conveyance device communicates in wireless fashion with the local cooking characteristics information conveyance device.

12. A cooking apparatus, comprising:

a smoker chamber a heater which heats said smoker chamber, and wherein said smoker chamber includes an internal smoker material reception device and a chamber wall, with said chamber wall having a smoker material access port provided therein with a removable access port cover member, and which access port is positioned relative to said smoker material reception device as to provide for a gravity feed of smoker material from the access port to said smoker material reception device, and wherein said heater is provided in said smoker chamber and is positioned as to heat smoking material placed in said smoker material reception device;

a local cooking characteristic information conveyance device supported by said smoker chamber and which includes a control unit with a smoker chamber temperature setting adjustment device and a set temperature display device, and wherein said control unit is supported by said smoker chamber as to be positioned externally to a heated cavity heated by said heater within said smoker chamber structure;

a remote cooking characteristic information conveyance device which is in data communication with said local cooking characteristic during operation and which comprises a cooking characteristic display, and wherein said remote cooking characteristic information conveyance device includes means for bidirectional information exchange as well as means for receiving cooking characteristic information from said local cooking characteristic information conveyance device and for transmitting cooking characteristic information to a local receiver supported by said smoker chamber; and a food item temperature probe assembly wherein said remote cooking characteristic conveyance device receives food item probe temperature information derived from said probe assembly.

13. The apparatus of claim 12 wherein said remote cooking characteristic information conveyance device further receives smoker chamber temperature information.

14. A cooking apparatus comprising:

an electric heater unit;

a control unit in communication with said heater unit;

a cooking pot which, in use, receives cooking fluid that is heated by said heater unit;

a cooking pot support shell for supporting said cooking pot and for supporting in position the control unit;

a cooking pot cover which is supported in flush fashion at an upper rim region of said cooking pot;

a food item support member for supporting the food item while positioned within said cooking pot;

a food item temperature probe assembly; and a local cooking characteristic information conveyance device that receives food item temperature data from said probe assembly and displays received food item temperature data on a display supported by said control unit, and wherein said local cooking characteristic information conveyance device forms part of said control unit, and said control unit further includes a cooking fluid temperature adjustment device with cooking fluid temperature setting display, and wherein said food item temperature probe assembly comprises a food probe for insertion into a food item supported by said food item support member and received within the cooking pot, and wherein said food item temperature probe assembly further comprises a communication line extending between said probe and said control unit while said cooking pot cover is supported as to cover said cooking pot;

a remote cooking characteristic information conveyance device which includes a display that displays food item temperature data determined by said probe assembly, and wherein said remote cooking characteristic information conveyance device includes a transmitter for adjusting a temperature setting associated with one or both of said heater unit and probe assembly.

15. A method of monitoring food item characteristics using the apparatus of claim 3 including inserting the food item in said food item container, inserting the food item probe in the food item; displaying in real time fashion at both the local and remote cooking characteristic information conveyance devices a read out of probe temperature.

16. The method of claim 15 wherein said food item is a whole turkey and the cooking apparatus is an electric turkey fryer.

17. A smoker apparatus, comprising:

a heater;

a food item container that comprises a smoker chamber structure that, in use, receives a food item to be heated by said heater, and wherein said smoker chamber includes an internal smoker material reception device and a chamber wall, with said chamber wall having a smoker material access port provided therein with a removable access port cover member, and which access port is positioned relative to said smoker material reception device as to provide for a gravity feed of smoker material from the access port to said smoker material reception device, and wherein said heater is provided in said smoker chamber and is positioned as to heat smoking material placed in said smoker material reception device;

a cooking characteristic monitoring system which includes, a local cooking characteristic information conveyance device which is visibly mounted externally on said food item container and which includes a control unit with a smoker chamber temperature setting adjustment device and an adjusted temperature display device; and wherein said control unit is supported by said smoker chamber as to be positioned externally to a heated cavity heated by said heater within said smoker chamber structure, wherein said removable access port cover member includes a handle, and wherein said access port cover forms an exterior wall of a smoker material loading device which is adjustable relative to said smoker material access port.

* * * * *